(12) United States Patent
Mukohara et al.

(10) Patent No.: US 10,626,831 B2
(45) Date of Patent: Apr. 21, 2020

(54) RUNNING GEAR STRUCTURE OF INTERNAL COMBUSTION ENGINE

(71) Applicant: HONDA MOTOR CO., LTD., Tokyo (JP)

(72) Inventors: Hodaka Mukohara, Wako (JP); Yamato Nakamizo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 15/898,940

(22) Filed: Feb. 19, 2018

(65) Prior Publication Data

US 2018/0283328 A1    Oct. 4, 2018

(30) Foreign Application Priority Data

Mar. 30, 2017  (JP) ................. 2017-068768

(51) Int. Cl.
*F02M 35/10*     (2006.01)
*F02M 35/16*     (2006.01)
(Continued)

(52) U.S. Cl.
CPC ........ *F02M 35/10157* (2013.01); *F01M 9/10* (2013.01); *F01M 13/04* (2013.01);
(Continued)

(58) Field of Classification Search
CPC ...... B60K 5/1208; B62K 11/04; F01M 13/04; F01M 2001/0207; F01M 2013/0461; F01M 9/10; F02B 2075/1808; F02B 61/02; F02B 67/04; F02B 67/06; F02B 75/1896; F02B 75/22; F02B 77/10; F02M 35/10157;
(Continued)

(56) References Cited

U.S. PATENT DOCUMENTS 3,730,147 A * 5/1973 Buchwald ................. F01P 5/10
                                                      123/41.44
4,643,143 A * 2/1987 Uchiyama ................. F01L 1/02
                                                      123/90.27
(Continued)

FOREIGN PATENT DOCUMENTS

JP     4602213     12/2010
JP     6076978      2/2017

OTHER PUBLICATIONS

German Office Action dated May 22, 2018 with English translation, 24 pages.

*Primary Examiner* — Jesse S Bogue
(74) *Attorney, Agent, or Firm* — Rankin, Hill & Clark LLP

(57) ABSTRACT

To provide a running gear structure of an internal combustion engine capable of reducing the size of the internal combustion engine. In a running gear structure of an internal combustion engine including a supercharger and a supercharger driving mechanism transmitting power to the supercharger and driving the supercharger, the supercharger driving mechanism is provided with driving force transmission members (a third intermediate gear and a fourth intermediate gear) disposed on a side opposite to cylinders of the internal combustion engine across valve trains driving a valve gear using, as a power supply, driving force of the crankshaft rotated by explosion in the cylinders. The valve train is disposed closer to an inner side of the internal combustion engine.

7 Claims, 13 Drawing Sheets

(51) Int. Cl.

| | |
|---|---|
| *F04D 29/054* | (2006.01) |
| *F04D 25/06* | (2006.01) |
| *F02B 77/10* | (2006.01) |
| *F02B 75/18* | (2006.01) |
| *F02B 61/02* | (2006.01) |
| *F02B 67/06* | (2006.01) |
| *F02B 67/04* | (2006.01) |
| *F01M 9/10* | (2006.01) |
| *F02B 75/22* | (2006.01) |
| *F01M 13/04* | (2006.01) |
| *F01M 1/02* | (2006.01) |
| *B62K 11/04* | (2006.01) |
| *B60K 5/12* | (2006.01) |
| *F16F 15/24* | (2006.01) |

(52) U.S. Cl.
CPC .............. *F02B 61/02* (2013.01); *F02B 67/04* (2013.01); *F02B 67/06* (2013.01); *F02B 75/1896* (2013.01); *F02B 75/22* (2013.01); *F02B 77/10* (2013.01); *F02M 35/162* (2013.01); *F04D 25/0606* (2013.01); *F04D 29/054* (2013.01); *B60K 5/1208* (2013.01); *B62K 11/04* (2013.01); *F01M 2001/0207* (2013.01); *F01M 2013/0461* (2013.01); *F02B 2075/1808* (2013.01); *F05D 2220/40* (2013.01); *F16F 15/24* (2013.01); *Y02T 10/144* (2013.01)

(58) Field of Classification Search
CPC . F02M 35/162; F04D 25/0606; F04D 29/054; F05D 2220/40; F16F 15/24; Y02T 10/144
See application file for complete search history.

(56) References Cited

U.S. PATENT DOCUMENTS

| | | | | |
|---|---|---|---|---|
| 5,085,199 | A * | 2/1992 | Sado | F02B 67/10 123/198 R |
| 5,129,375 | A * | 7/1992 | Takane | F01L 1/02 123/195 C |
| 5,216,989 | A | 6/1993 | Iwata et al. | |
| 5,564,380 | A * | 10/1996 | Kobayashi | F01L 1/02 123/192.2 |
| 6,904,885 | B2 * | 6/2005 | Osband | F02B 75/22 123/190.1 |
| 8,408,188 | B1 * | 4/2013 | Hormilla | F02B 67/06 123/195 A |
| 2011/0239987 | A1 * | 10/2011 | Maehara | F01L 1/181 123/406.46 |
| 2012/0247438 | A1 * | 10/2012 | Konohara | F01M 13/022 123/559.1 |
| 2015/0184585 | A1 * | 7/2015 | Naruoka | F02B 33/40 123/559.1 |
| 2016/0032797 | A1 * | 2/2016 | Matsuda | F01M 13/04 123/559.1 |
| 2017/0284319 | A1 * | 10/2017 | Fukuda | F02B 39/04 |

* cited by examiner

RUNNING GEAR STRUCTURE OF INTERNAL COMBUSTION ENGINE

INCORPORATION BY REFERENCE

The present application claims priority under 35 U.S.C. § 119 to Japanese Patent Application No. 2017-068768 filed on Mar. 30, 2017. The content of the application is incorporated herein by reference in its entirety.

TECHNICAL FIELD

The present invention relates to a structure of a running gear of an internal combustion engine.

BACKGROUND ART

Such a conventional technique is described that drives a cam by transmitting rotation of a crankshaft to a cam drive sprocket through an intermediate idling shaft and other shafts and transmitting rotation of the cam drive sprocket to a cam driven sprocket through a cam chain (see Patent Literature 1, for example).

Furthermore, relating to a chain driving mechanism that transmits driving force to a supercharger, such a structure is disclosed that takes out the driving force from an inner side of a crankshaft with respect to a cam chain disposed on a side of the engine (for example, see Patent Literature 2).

CITATION LIST

Patent Literature

[Patent Literature 1] JP No. 4602213
[Patent Literature 2] JP No. 6076978

SUMMARY OF INVENTION

Technical Problem

In Patent Literature 1 and Patent Literature 2, an internal combustion engine with a supercharger, which drives by taking out power of the supercharger from a side of a crankshaft of the internal combustion engine, needs to include a supercharger driving mechanism. In this construction, however, the internal combustion engine needs to arrange a cam driving mechanism for driving a cam in a valve system and the supercharger driving mechanism in a manner offset from each other in a direction of the crankshaft in order to prevent interference between the cam driving mechanism and the supercharger driving mechanism. In order to arrange the cam driving mechanism distantly from the supercharger driving mechanism, a valve train of the internal combustion engine is moved in a direction of the crankshaft, which problematically increases the size of the internal combustion engine.

The present invention has been achieved in view of the above-mentioned circumstances, and it is an object thereof to provide a running gear structure of an internal combustion engine capable of reducing the size of the internal combustion engine.

Solution to Problem

In order to achieve the object, according to a first feature of the present invention, there is provided a supercharger driving structure of an internal combustion engine including a supercharger (18) and a supercharger driving mechanism (90) that drives the supercharger (18) by transmitting power to the supercharger (18), in which the supercharger driving mechanism (90) is provided with driving force transmission members (69, 71) disposed on a side opposite, across a valve train (89), to a cylinder (31a, 41a) of the internal combustion engine (10), the valve train (89) driving a valve gear (100) using, as a power supply, driving force of a crankshaft (16) rotated by explosion in the cylinder (31a, 41a).

According to a second feature of the present invention, in addition to the first feature, the supercharger driving mechanism (90) includes a supercharger-side driving gear (69) constituting the driving force transmission members (69, 71), and the valve train (89) includes a valve-side driving gear (68). The supercharger-side driving gear (69) and the valve-side driving gear (68) may be supported by an identical intermediate shaft (61).

According to a third feature of the present invention, in addition to the first feature, the intermediate shaft (61) has: the supercharger-side driving gear (69) disposed at an outer end portion in a direction of the crankshaft (16); a driven gear (67) disposed on an inner side in the direction of the crankshaft (16) with respect to the supercharger-side driving gear (69), the driven gear (67) meshing with a crankshaft-side driving gear (65) provided on the crankshaft (16); and the valve-side driving gear (68) disposed between the supercharger-side driving gear (69) and the driven gear (67). Among the supercharger-side driving gear (69), the driven gear (67), and the valve-side driving gear (68), the valve-side driving gear (68) may have a smallest outer diameter.

According to a fourth feature of the present invention, in addition to the first feature, the internal combustion engine (10) includes fuel injectors (88) injecting fuel into the cylinders (31a, 41a) and a fuel pump (86) pumping fuel to the fuel injectors (88), and a driving cam (78) that drives the fuel pump (86) may be provided on a driving shaft (63) constituting the valve train (89).

According to a fifth feature of the present invention, in addition to the first feature, the valve train (89) includes drive sprockets (76, 77) provided on the driving shaft (63) and driven sprockets (82) driven by the drive sprockets (76, 77) through timing chains (83, 84). The driving shaft (63) is driven by the crankshaft (16) through a speed-reduction mechanism (87). Each drive sprocket (76, 77) may have the same outer diameter as that of the driven sprocket (82).

According to a sixth feature of the present invention, in addition to the first feature, a side cover (21) that covers an exterior of the supercharger driving mechanism (90) has its outer surface covered by a separate cover (22). The side cover (21) and the separate cover (22) may form a breather device (146) that separates vapor and liquid from blow-by gas.

According to a seventh feature of the present invention, in addition to the first feature, the side cover (21) is fixed to an auxiliary machine cover (20) that covers an auxiliary machine (161) provided to the internal combustion engine (10). An oil passage (150) on which oil travels is formed on a faying surface between the auxiliary machine cover (20) and the side cover (21). The oil passage (150) may communicate with an inside of the supercharger (18) on a downstream side of the oil passage (150).

According to an eighth feature of the present invention, in addition to the first feature, the internal combustion engine (10) includes a crankcase (11) accommodating the crankshaft (16), cylinder blocks (31, 41) mounted on the crankcase (11), and cylinder heads (32, 42) mounted on the cylinder blocks (31, 41). An accommodation chamber (12A)

accommodating the valve train (89) includes accommodation members (181, 182) formed separately from the side cover (21) and the cylinder blocks (31, 41). Each accommodation member (181, 182) has an end portion sealed together with the corresponding cylinder head (32, 42) with an inner and outer diameter sealing structure using an annular sealing member (185) and has another end sealed together with the crankcase (11) with a planar surface sealing structure using an annular sealing member (184).

Advantageous Effects of Invention

A supercharger driving mechanism according to an aspect of the present invention includes a driving force transmission member disposed on a side opposite to a cylinder of an internal combustion engine across a valve train that drives a valve gear using, as a power supply, driving force of a crankshaft rotated by explosion in the cylinder. With this construction, in the internal combustion engine with a supercharger, the valve train can be disposed closer to an inner side of the internal combustion engine by disposing the supercharger driving mechanism on an outer side in a vehicle width direction with respect to the valve train. This construction can prevent an increase in the width of a cylinder head in a direction of the crankshaft and accordingly achieve a reduction in the size of the internal combustion engine.

In the above-described aspect of the invention, the supercharger driving mechanism includes a supercharger-side driving gear constituting a driving force transmission member, and a valve train includes a valve-side driving gear. The supercharger-side driving gear and the valve-side driving gear are supported by an identical intermediate shaft. Share of the intermediate shaft between the supercharger-side driving gear of the supercharger driving mechanism and the valve-side driving gear of the valve train allows the supercharger-side driving gear to be provided and the supercharger driving mechanism to be accordingly added without an increase in the number of rotation shafts.

In the above-described aspect of the invention, the intermediate shaft has: the supercharger-side driving gear disposed at an outer end portion in a direction of the crankshaft; a driven gear disposed on an inner side in the direction of the crankshaft with respect to the supercharger-side driving gear, the driven gear meshing with a crankshaft-side driving gear provided on a crankshaft; and the valve-side driving gear disposed between the supercharger-side driving gear and the driven gear. Among the supercharger-side driving gear, the driven gear, and the valve-side driving gear, the valve-side driving gear has a smallest outer diameter. This construction allows a compact layout with the valve-side driving gear disposed on the intermediate shaft in a manner avoiding interference between the supercharger-side driving gear, the driven gear, and the valve-side driving gear in an axial direction.

In the above-described aspect of the invention, the internal combustion engine includes a fuel injector injecting fuel into the cylinder and a fuel pump pumping fuel to the fuel injector. A driving cam that drives the fuel pump is provided on a driving shaft constituting the valve train. The fuel pump can be therefore driven using the driving shaft, and this construction allows a reduction in the number of parts and a reduction in size.

In the above-described aspect of the invention, the valve train includes a drive sprocket provided on the driving shaft and a driven sprocket driven by the drive sprocket through a timing chain. The driving shaft is driven by the crankshaft through a speed-reduction mechanism, and the drive sprocket has the same outer diameter as that of the driven sprocket. This construction allows the driven sprocket to have a smaller diameter by reducing rotational frequency of the crankshaft and having the drive sprocket and the driven sprocket rotate at the same frequency. A reduction in the size of the valve gear and accordingly a reduction in the size of the internal combustion engine can be achieved with this construction.

In the above-described aspect of the invention, a side cover that covers an exterior of the supercharger driving mechanism has its outer surface covered by a separate cover. The side cover and the separate cover form a breather device that separates vapor and liquid from blow-by gas. Formation of the breather device in a lateral side using the side cover and the separate cover allows such a layout that ensures the degree of freedom in arrangement of the breather device even when the breather device is unable to be arranged on a body side of the internal combustion engine including the crankcase and others.

In the above-described aspect of the invention, the side cover is fixed to an auxiliary machine cover that covers an auxiliary machine provided in the internal combustion engine. An oil passage on which oil travels is formed on a faying surface between the auxiliary machine cover and the side cover. The oil passage communicates with an inside of the supercharger on a downstream side of the oil passage. The oil passage leading to the supercharger can be formed using the auxiliary machine cover and the side cover, which facilitates formation of the oil passage, compared to a construction with the oil passage provided inside the internal combustion engine.

In the above-described aspect of the invention, the internal combustion engine includes a crankcase accommodating the crankshaft, a cylinder block mounted on the crankcase, and a cylinder head mounted on the cylinder block. An accommodation chamber accommodating the valve train includes an accommodation member formed separately from the side cover and the cylinder block. The accommodation member has an end portion sealed together with the cylinder head with an inner and outer diameter sealing structure using an annular sealing member and has another end portion sealed together with the crankcase with a planar surface sealing structure using an annular sealing member. This construction renders fastening distortion and heating distortion even by having a part of the accommodation chamber separately formed, thereby controlling oil consumption and the amount of blow-by gas. Furthermore, combination use of the inner and outer diameter sealing structure and the planar surface sealing structure can allow a difference in size between the crankcase and the cylinder head resulting from machining and assembly accuracy.

BRIEF DESCRIPTION OF DRAWINGS

FIG. 12A to FIG. 12C are illustrative views of the front chain chamber, in which FIG. 12A is a plan view of the front chain chamber, FIG. 12B is a sectional view of FIG. 12A taken along line B-B, and FIG. 12C is a bottom view of the front chain chamber.

DESCRIPTION OF EMBODIMENTS

Figure 1:
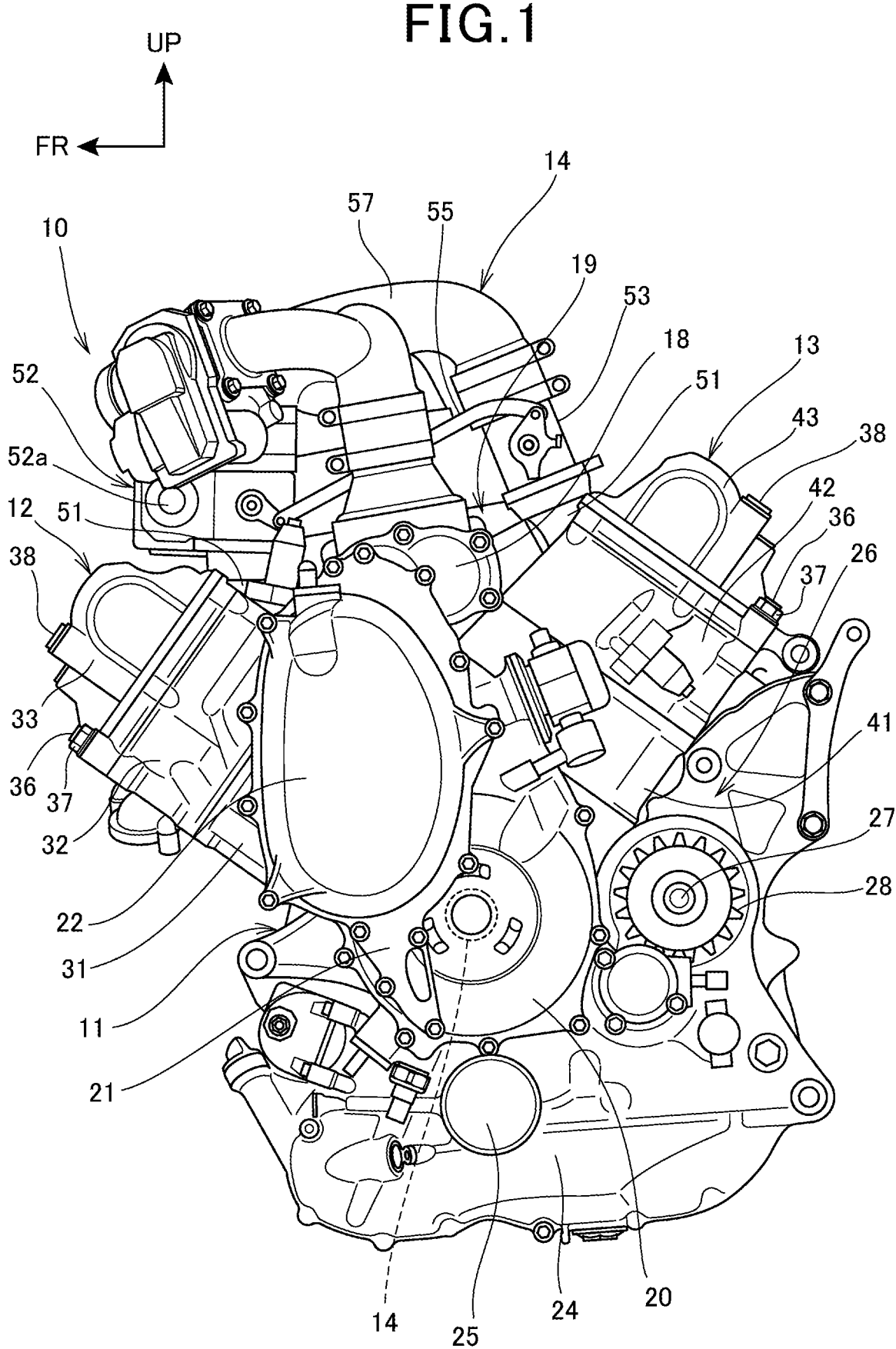
FIG. 1 is a left side view of an internal combustion engine according to an embodiment of the present invention.

An embodiment of the present invention will now be described with reference to the drawings. It is to be noted that, throughout the description, references to directions, such as front, rear, left, right, upward, and downward, are made with reference to a vehicle body, unless otherwise stated. It is also to be noted that, in the drawings, reference sign FR denotes the front of the vehicle body, reference sign UP denotes the upper side of the vehicle body, and reference sign LH denotes the left side of the vehicle body.

FIG. 1 is a left side view of an internal combustion engine 10 according to the present invention.

The internal combustion engine 10 formed in a V-shape and equipped with a motorcycle includes a crankcase 11, a front cylinder section 12 extending in an obliquely forward and upward direction of the vehicle from an upper portion of the crankcase 11 and a rear cylinder section 13 extending in an obliquely rearward and upward direction of the vehicle from an upper portion of the crankcase 11. The front cylinder section 12 and the rear cylinder section 13 are arranged in a manner forming a V-shape.

The internal combustion engine 10 has an intake device 14 connected to a rear portion of the front cylinder section 12 and a front portion of the rear cylinder section 13 and has an exhaust device (not shown) connected to a front portion of the front cylinder section 12 and a rear portion of the rear cylinder section 13.

The intake device 14 includes a supercharger 18 driven by power of a crankshaft 16 accommodated in the crankcase 11. The supercharger 18 is disposed in a space 19 formed between a rear surface of the front cylinder section 12 and a front surface of the rear cylinder section 13.

An ACG cover 20 covering a lateral side of an AC generator (ACG: an alternate current generator) provided around the crankshaft 16 is mounted on a left side surface of the crankcase 11. A side cover 21 is mounted on the ACG cover 20. The side cover 21 accommodates therein a supercharger driving mechanism (not shown) that transmits power from the crankshaft 16 to the supercharger 18 and drives the supercharger 18.

Furthermore, a breather cover 22 forming a breather chamber (not shown) through which blow-by gas in the crankcase 11 passes is mounted on an upper portion of the side cover 21. In the breather chamber, liquid oil is separated from the blow-by gas.

An oil pan 24 for storing oil is provided underneath the crankcase 11. An oil filter 25 is provided to a side surface of the oil pan 24.

A transmission 26 is integrally provided in a rear portion of the crankcase 11. The transmission 26 includes an output shaft 27 protruding in a lateral side from a side surface of the crankcase 11 and a drive sprocket 28 provided on the output shaft 27. The drive sprocket 28 is coupled to a driven sprocket provided on a side of a rear wheel of the motorcycle through a chain. With this construction, driving force is transmitted from the transmission 26 to the rear wheel.

The front cylinder section 12 includes a front cylinder block 31, a front cylinder head 32, and a front head cover 33 sequentially mounted on the crankcase 11. The front cylinder block 31 and the front cylinder head 32 are fastened to the crankcase 11 with a plurality of stud bolts 36 and nuts 37. The front head cover 33 is fastened to the front cylinder head 32 with a plurality of bolts 38.

The rear cylinder section 13 includes a rear cylinder block 41, a rear cylinder head 42, and a rear head cover 43 sequentially provided to the crankcase 11. The rear cylinder block 41 and the rear cylinder head 42 are fastened to the crankcase 11 with the stud bolts 36 and the nuts 37. The rear head cover 33 is fastened to the rear cylinder head 42 with the bolts 38.

The intake device 14 includes intake pipes 51, a throttle device 52 for TBW, a throttle device 53, a connecting tube 57, and the supercharger 18.

The front cylinder head 32 is provided with the intake pipe 51, and the intake pipe 51 is connected with the throttle device 52 for TBW. The throttle device 52 for TBW is a part including an electric motor 52a and a throttle valve (not shown) driven by the electric motor 52a and constituting the following TBW.

A throttle by wire (TBW) is a system that detects rotation of a throttle grip equipped to a motorcycle with a sensor, transmits the detecting signal to the electric motor 52a through a wire, and opens/closes the throttle valve with the electric motor 52a.

The rear cylinder head 42 is provided with the intake pipe 51, and the intake pipe 51 is connected with the throttle device 53. The throttle device 53 is provided with a throttle valve (not shown) opened and closed in conjunction with the throttle valve of the throttle device 52 for TBW. Both the throttle valves are coupled with each other by a rod 55.

The throttle device 52 for TBW and the throttle device 53 are connected with respective ends of the bifurcated connecting tube 57. An end formed at a middle portion of the connecting tube 57 is connected with the supercharger 18.

The supercharger 18 is connected with an air cleaner through a connecting tube (not shown) in an upstream side.

Figure 2:
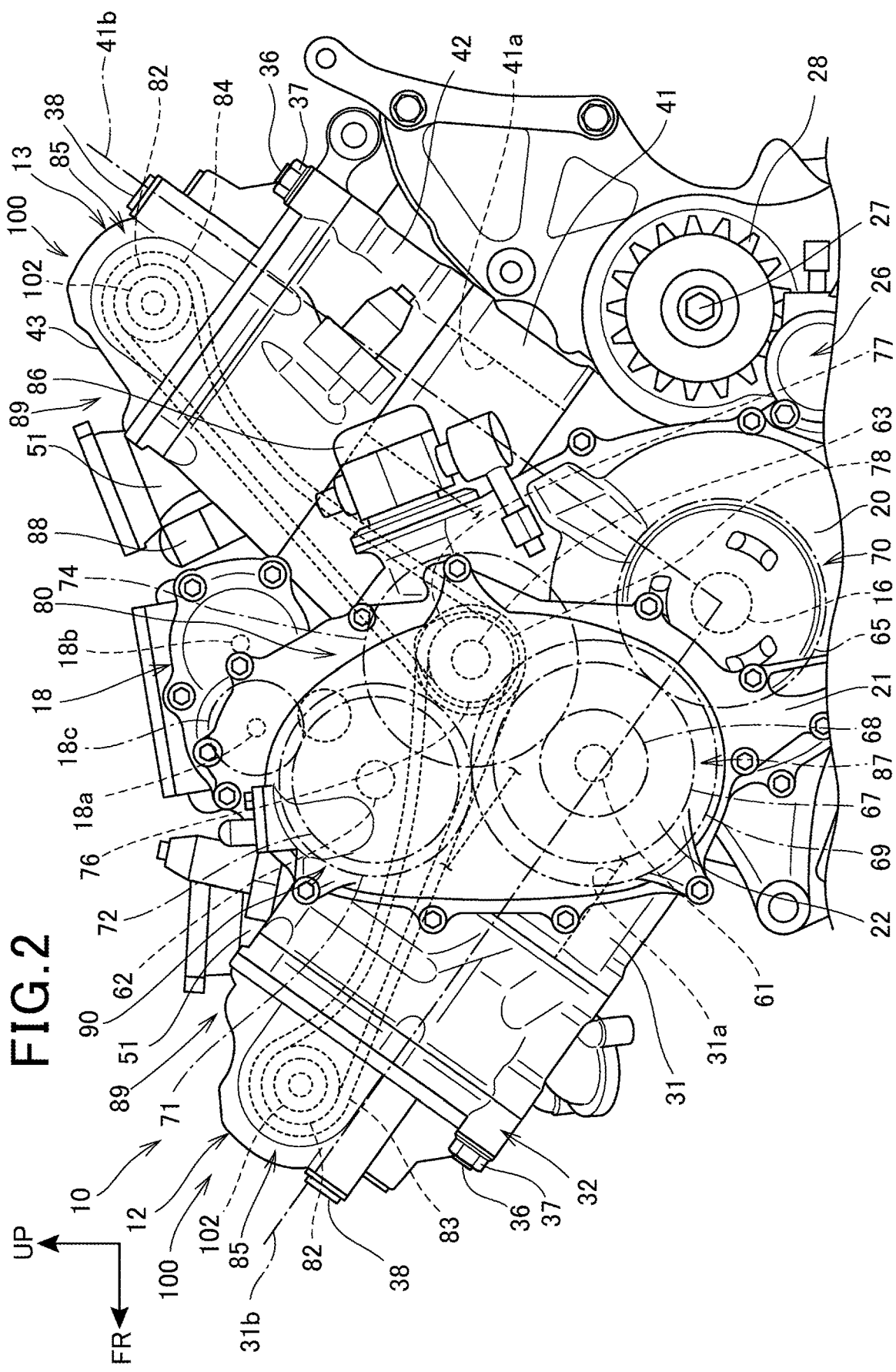
FIG. 2 is an enlarged view of the essential parts in FIG. 1.

FIG. 2 is an enlarged view of the essential parts in FIG. 1. The front cylinder block 31 accommodates therein a tubular cylinder 31a, and a piston is movably inserted into the cylinder 31a. Likewise, the rear cylinder block 41 accommodates therein a tubular cylinder 41a, and a piston is movably inserted into the cylinder 41a. Cylinder axes 31b and 41b passing the respective centers of the cylinders 31a and 41a form a right angle.

The crankcase 11 rotatably supports a pair of intermediate shafts 61 and 62 positioned on an inner side in the vehicle width direction with respect to the breather cover 22 and rotatably supports a driving shaft 63 positioned above the crankshaft 16.

The crankshaft 16 is provided with a main driving gear 65.

The intermediate shaft 61 as one of intermediate shafts is provided with a first intermediate gear 67 meshing with the main driving gear 65, a second intermediate gear 68 having a smaller diameter than that of the first intermediate gear 67, and a third intermediate gear 69 having a larger diameter than that of the first intermediate gear 67.

The intermediate gear 62 as the other intermediate shaft is provided with a fourth intermediate gear 71 meshing with the third intermediate gear 69 and a fifth intermediate gear 72 having a smaller diameter than that of the fourth intermediate gear 71.

The driving shaft 63 is provided with a sub-driving gear 74 meshing with the second intermediate gear 68, a pair of a first timing sprocket 76 and a second timing sprocket 77, and a cam 78.

The front cylinder head 32 and the rear cylinder head 42 rotatably support the respective camshafts 102, and the respective camshafts 102 of the front cylinder head 32 and the rear cylinder head 42 are provided with cam sprockets 82.

A first timing chain 83 is suspended over the first timing sprocket 76 and the cam sprocket 82 of the front cylinder head 32, and a second timing chain 84 is suspended over the second timing sprocket 77 and the cam sprocket 82 of the rear cylinder head 42.

Because the above-described first timing sprocket 76, the second timing sprocket 77, and the cam sprockets 82 have the same number of teeth, the driving shaft 63 and the pair of camshafts 102 have the same rotational frequency.

The above-described main driving gear 65, the first intermediate gear 67, the second intermediate gear 68, and the sub-driving gear 74 constitute a speed-reduction mechanism 87 that reduces a speed of rotation of the crankshaft 16 and transmits the reduced speed to the driving shaft 63.

The rotational frequency is reduced by half when the rotation of the crankshaft 16 is transmitted to the driving shaft 63 through the speed-reduction mechanism 87. In other words, the rotational frequency of the camshaft 102 becomes a half of that of the crankshaft 16.

For example, if the number of teeth of the cam sprocket 82 is increased to twice the number of teeth of the first timing sprocket 76 and the number of teeth of the second timing sprocket 77 to secure the rotational frequency of the camshaft 102, the cam sprocket 82 comes to have a larger outer diameter than that of the first timing sprocket 76 and that of the second timing sprocket 77. This construction increases the sizes of the front cylinder section 12 and the rear cylinder section 13.

In this embodiment, the cam sprocket 82 has the same outer diameter as that of the first timing sprocket 76 and that of the second timing sprocket 77. This construction allows the cam sprocket 82 to have a smaller diameter, and the size of the front cylinder section 12 and the size of the rear cylinder section 13 thus can be reduced.

The supercharger 18 has a pair of rotor shafts 18a and 18b disposed parallel with each other, and each of the rotor shafts 18a and 18b is provided with a rotor (not shown). The rotor shaft 18a is provided with a rotor shaft gear 18c meshing with the fifth intermediate gear 72.

A high-pressure fuel pump 86 activated by the power of the driving shaft 63 is mounted on a rear portion of the ACG cover 20.

The high-pressure fuel pump 86 is driven by rotation of the cam 78 provided to the driving shaft 63. Fuel, the pressure of which has been increased by the high-pressure fuel pump 86, is injected to respective combustion chambers of the front cylinder section 12 and the rear cylinder section 13 through respective fuel injection valves 88 (only one of the fuel injection valves 88 is shown) provided to the front cylinder head 32 and the rear cylinder head 42.

The above-described crankshaft 16, the main driving gear 65, the intermediate shaft 61, the first intermediate gear 67, the second intermediate gear 68, and the third intermediate gear 69 constitute a main driving mechanism 70.

Also, the driving shaft 63, the first timing sprocket 76, the second timing sprocket 77, the first timing chain 83, the second timing chain 84, and the pair of cam sprockets 82 constitute a camshaft driving mechanism 80 that drives the respective camshafts 102 of the front cylinder section 12 and the rear cylinder section 13. The camshaft driving mechanism 80 is driven by the second intermediate gear 68 of the main driving mechanism 70, and the camshaft driving mechanism 80 drives the pair of camshafts 102. The second intermediate gear 68 may be included in the camshaft driving mechanism 80.

Each of the front cylinder head 32 and the rear cylinder head 42 includes a rocker shaft, rocker arms, valve springs, intake valves and exhaust valves, and others. The camshaft 102 constitute a valve gear (a valve system) 100 opening and closing the intake valves and the exhaust valves along with the rocker shaft, the rocker arms, the valve springs, and others.

The above-described camshaft driving mechanism 80 and the valve gear 100 constitute a valve train 89 that drives the intake valves and the exhaust valves.

Furthermore, the intermediate shaft 62, the fourth intermediate gear 71, and the fifth intermediate gear 72 constitute a supercharger driving mechanism 90. The supercharger driving mechanism 90 is driven by the third intermediate gear 69 of the main driving mechanism 70, and the supercharger driving mechanism 90 drives the supercharger 18. The third intermediate gear 69 may be included in the supercharger driving mechanism 90.

As described above, in a running gear structure of the internal combustion engine 10 including the supercharger 18 and the supercharger driving mechanism 90 transmitting power to the supercharger 18 and driving the supercharger 18, the supercharger driving mechanism 90 includes the third intermediate gear 69 and the fourth intermediate gear 71 as driving force transmission members disposed on a side opposite to the cylinders 31a and 41a across the valve trains 89. The valve trains 89 drive the valve gears 100 using driving force of the crankshaft 16 rotated by explosion in the cylinders 31a and 41a of the internal combustion engine 10 as a power supply. An inside of each of the cylinder 31a and 41a constitutes a part of the corresponding combustion chamber, and respective fuel injection valves 88 inject fuel into the cylinders 31a and 41a.

With this construction of the internal combustion engine 10 including the supercharger 81, the supercharger driving mechanism 90 is disposed on an outer side in the vehicle width direction (the direction of the crankshaft 16) with respect to the valve train 89. This construction allows the valve train 89 to be disposed closer to an inner side of the internal combustion engine 10, which can prevent an increase in widths of the front cylinder head 32 and the rear cylinder head 42 in the crankshaft direction and accordingly achieve a reduction in the size of the internal combustion engine 10.

The supercharger driving mechanism 90 further includes the third intermediate gear 69 as a supercharger-side driving gear constituting the third intermediate gear 69 and the fourth intermediate gear 71, and the valve train 89 includes the second intermediate gear 68 as a valve-side driving gear. The third intermediate gear 69 and the second intermediate gear 68 are supported by an identical intermediate shaft 61.

In this construction, the third intermediate gear 69 and the second intermediate gear 68 share the intermediate shaft 61, which allows the third intermediate gear 69 to be provided and the supercharger driving mechanism 90 to be accordingly added without an increase in the number of rotation shafts.

Figure 3:
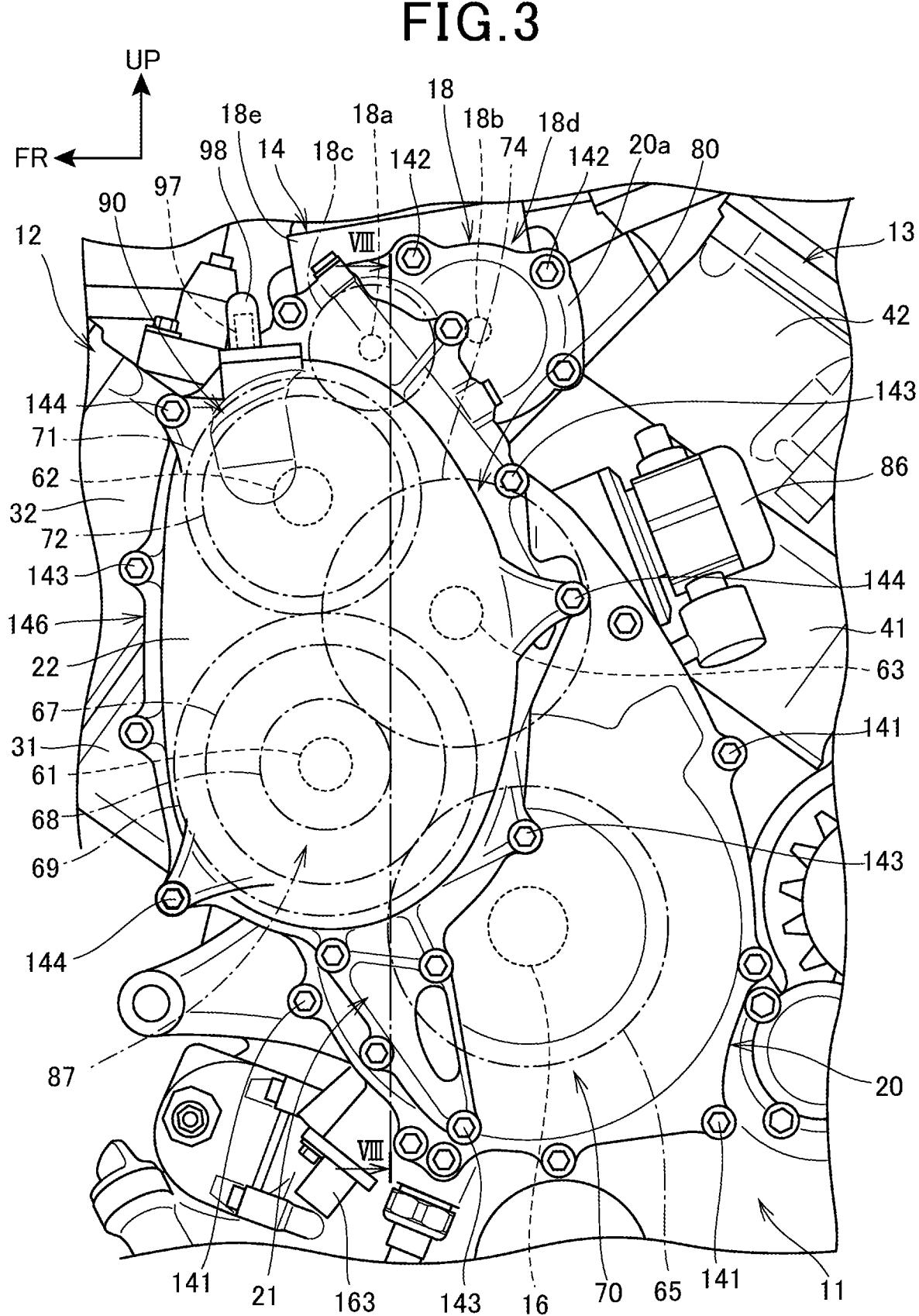
FIG. 3 is an enlarged view of the essential parts in FIG. 2.
Figure 4:
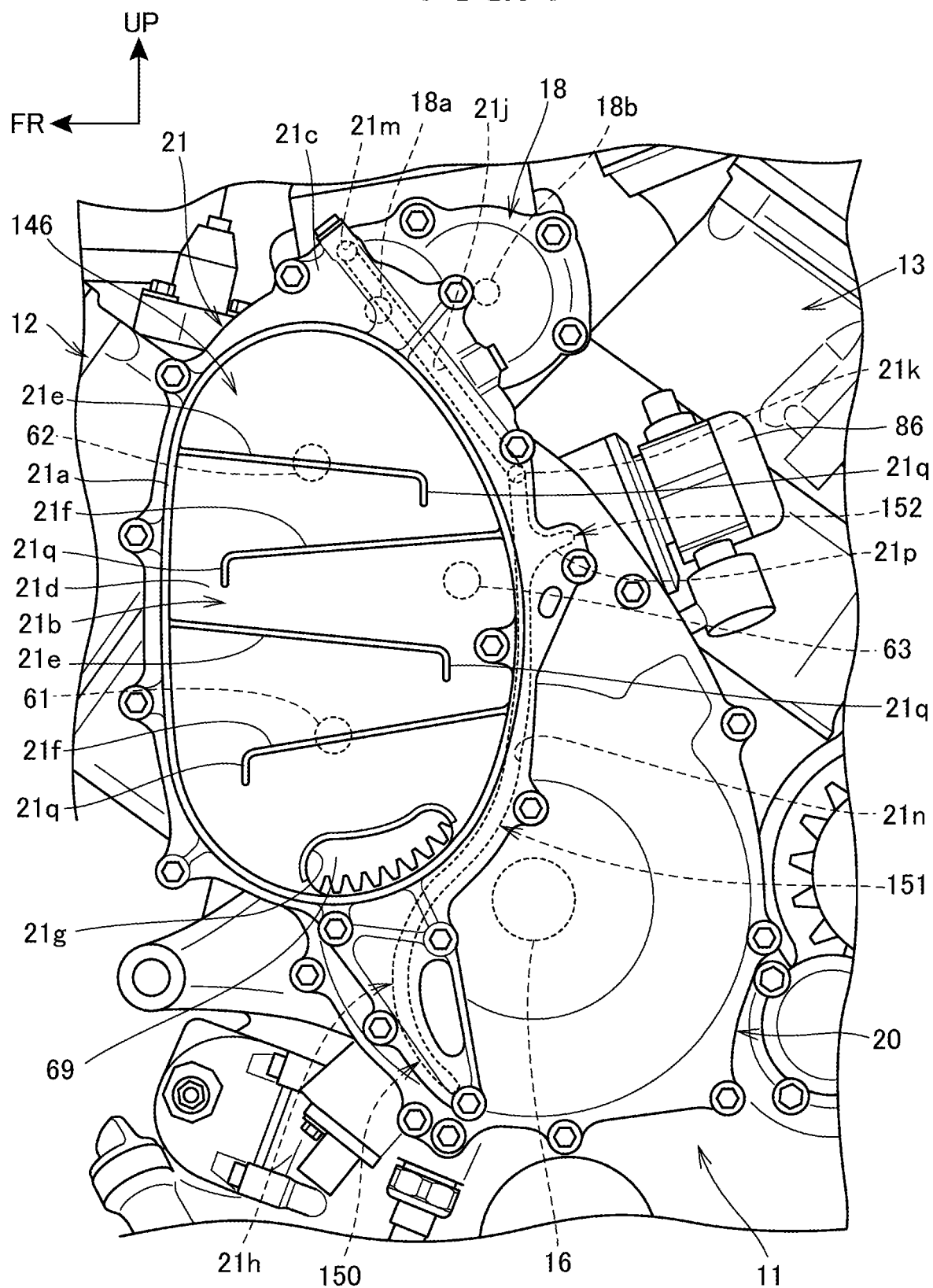
FIG. 4 is a left side view of FIG. 3 with a breather cover detached.
Figure 5:
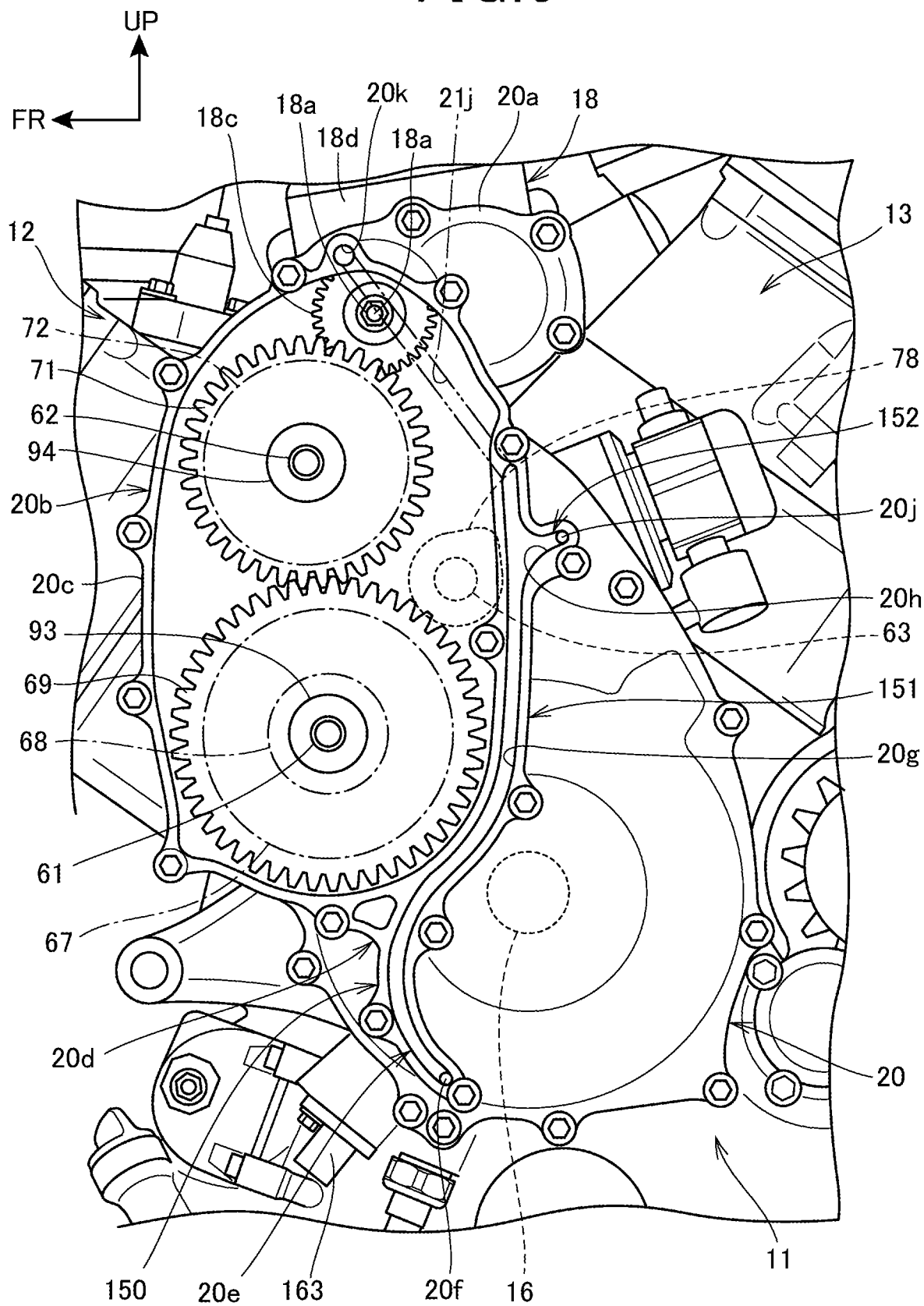
FIG. 5 is a left side view of FIG. 4 with a side cover detached.

FIG. 3 is an enlarged view of the essential parts in FIG. 2. FIG. 4 is a left side view of FIG. 3 with the breather cover 22 detached. FIG. 5 is a left side view of FIG. 4 with the side cover 21 detached.

As shown in FIG. 3, the ACG cover 20 is mounted on a side wall of the crankcase 11 with a plurality of bolts 141. The ACG cover 20 is provided integrally with a supercharger cover 20a constituting a case 18d of the supercharger 18. The case 18d of the supercharger 18 includes a case body 18e and the supercharger cover 20a closing an opening formed at a left side portion of the case body 18e. The supercharger cover 20a is integrally formed on the ACG cover 20 and mounted on the case body 18e with a plurality of bolts 142.

The side cover 21 is mounted, with a plurality of bolts 143, on an upper portion of a side surface of the ACG cover 20, more specifically, in the upward and obliquely frontward direction of the crankshaft 16 on the side surface of the ACG cover 20. Furthermore, the breather cover 22 having a slightly smaller contour than that of the side cover 21 is mounted on the side surface of the side cover 21 with a plurality of bolts 144. The bolts 141, 142, 143, and 144 may be the same bolts.

The breather cover 22 is positioned on a lateral side of a part (the intermediate shaft 61, the first intermediate gear 67, the second intermediate gear 68, and the third intermediate gear 69) of the main driving mechanism 70, a lateral side of a part (the driving shaft 63) of the camshaft driving mechanism 80, and a lateral side of the supercharger driving mechanism 90 (the intermediate shaft 62, the fourth intermediate gear 71, and the fifth intermediate gear 72).

A discharge port 97 for discharging the blow-by gas is provided on an upper end portion of the breather cover 22. The discharge port 97 is connected to the intake device 14 through a hose 98, and the blow-by gas is sent to the combustion chamber along with fuel.

As shown in FIG. 4, the side cover 21 includes a frame portion 21a in a substantially oval shape, a side wall 21b flatly formed on an inside of the frame portion 21a, and a peripheral edge portion 21c formed around the frame portion 21a. The side wall 21b is positioned on an inner side in the vehicle width direction with respect to an end face of the frame portion 21a. A plurality of front-side ribs 21e extending rearward from a front side of the frame portion 21a and a plurality of rear-side ribs 21f extending frontward from a rear side of the frame portion 21a are alternately formed on a side surface 21d of the side wall 21b in the vertical direction. The front-side rib 21e and the rear-side rib 21f have bent portions 21q bent downward on the respective distal end portions.

The side cover 21 (specifically, an inside of the frame portion 21a) and the breather cover 22 (see FIG. 3) constitute a breather device 146. The breather device 146 has a labyrinthine structure composed of the front-side ribs 21e, the rear-side ribs 21f, and a plurality of later-described ribs formed on the breather cover 22.

A suction opening 21g for sucking the blow-by gas into the breather device 146 is formed at a lower end portion of the side wall 21b. The suction opening 21g leads to an inside of the crankcase 11 and an inside of the ACG cover 20.

Flow of the blow-by gas relating to the above-described breather device 146 will now be described.

The blow-by gas is led to flow into the breather device 146 from the suction opening 21g, the blow-by gas travels upward in the breather device 146 through the labyrinthine structure, and the blow-by gas is discharged from the discharge port 97 (see FIG. 3). When the blow-by gas is passing through the labyrinthine structure, liquid oil contained in the blow-by gas is separated from the blow-by gas and drops, and the liquid oil is returned to a side of the crankcase 11 through the suction opening 21g. Additionally, the bent portion 21q provided to each of the front-side ribs 21e and the rear-side ribs 21f renders the labyrinthine structure more complicated, which exerts advantageous effects in separating the oil.

Furthermore, the front-side ribs 21e and the rear-side ribs 21f formed on the side cover 21 can increase stiffness of the side cover 21.

The side cover 21 is provided with an oil groove 21h forming a passage for the oil at a rear lower portion of the peripheral edge portion 21c and on an inner surface (a mounting surface to the ACG cover 20) of the peripheral edge portion 21c. The oil groove 21h is a portion forming a passage for the oil in cooperation with the ACG cover 20, and the oil groove 21h is constituted of a main groove 21n vertically extending and a bifurcated groove 21p bifurcated from an upper portion of the main groove 21n to a side of the high-pressure fuel pump 86 in side view.

An oil hole 21j linearly extending in a manner inclined upwardly toward the front, a lower-end side oil hole 21k connected to a lower end portion of the oil hole 21j, and an upper-end side oil hole 21m connected to an upper end portion of the oil hole 21j are bored on an upper portion of the peripheral edge portion 21c.

The lower-end side oil hole 21k is connected to the oil groove 21h. The upper-end side oil hole 21m is connected to an oil hole (not shown) of the supercharger cover 20a.

As shown in FIG. 5, the ACG cover 20 has a side cover mounting portion 20b on which the side cover 21 (see FIG. 4) is mounted. The side cover mounting portion 20b has the same contour shape as that of the side cover 21. The side cover 21 is mounted on the side cover mounting portion 20b through a gasket (not shown).

The side cover mounting portion 20b is constituted of a frame portion 20c and a frame outer portion 20d formed rearward and downward of the frame portion 20c.

The intermediate shaft 61, the first intermediate gear 67, the second intermediate gear 68, the third intermediate gear 69, the driving shaft 63, the cam 78, the intermediate shaft 62, the fourth intermediate gear 71, the fifth intermediate gear 72, the rotor shaft 18a, and the rotor shaft gear 18c are disposed inside the frame portion 20c.

The intermediate shafts 61 and 62 have respective distal end portions supported by the side cover 21 (see FIG. 4) through bearings 93 and 94.

An upper-end side oil hole 20k connected to the upper-end side oil hole 21m (see FIG. 4) of the side cover 21 is bored at an upper end portion of the frame portion 20c. The upper-end side oil hole 20k communicates with an inside of the supercharger cover 20a through the upper-end side oil hole 21m and the oil hole of the supercharger cover 20a (see FIG. 4).

An oil groove 20e forming a passage for the oil and a lower-end side oil hole 20f connected to a lower end portion of the oil groove 20e are bored on the frame outer portion 20d. The oil groove 20e is constituted of a main groove 20g vertically extending and a bifurcated groove 20h bifurcated from an upper portion of the main groove 20g to a side of the high-pressure fuel pump 86 in side view. The frame outer portion 20d further has an oil hole 20j connected to a rear end portion of the bifurcated groove 20h. The oil hole 20j communicates with an inside of a base portion for the high-pressure fuel pump 86 of the ACG cover 20.

The lower-end side oil hole 20f communicates with the inside of the crankcase 11.

As shown in FIG. 4 and FIG. 5, the oil groove 20e of the ACG cover 20 and the oil groove 21h of the side cover 21 form an oil passage 150. The main groove 20g and the main groove 21n form an oil passage 151, and the bifurcated groove 20h and the bifurcated groove 21p form an oil passage 152.

Flow of the oil in each of the above-described portions will now be described.

Oil led to flow into the oil passage 150 from the crankcase 11 side through the lower-end side oil hole 20f travels upward in the oil passage 151. The oil split to flow into the oil passage 152 on the way is led into the inside of the base portion for the high-pressure fuel pump 86 through the oil hole 20j. The oil has a sliding portion of the high-pressure fuel pump 86 and the cam 78 and its periphery lubricated and returns into the crankcase 11.

The oil led to flow into the oil hole 21j of the side cover 21 through the oil passage 151 is led into the case 18d of the supercharger 18 from the oil hole 21j through the upper-end side oil hole 21m of the side cover 21 and the upper-end side oil hole 20k of the ACG cover 20. The oil has the rotor shaft 18a and the rotor shaft gear 18c and its periphery lubricated and returns into the crankcase 11 from an unillustrated oil return passage.

As shown in FIG. 2 and FIG. 5, the internal combustion engine 10 includes fuel injection valves 88 serving as fuel injectors injecting fuel into the cylinders 31a and 41a and the high-pressure fuel pump 86 serving as a fuel pump pumping fuel to the fuel injection valves 88. The driving shaft 63 constituting the valve train 89 is provided with the cam 78 serving as a driving cam for driving the high-pressure fuel pump 86.

With this construction, the high-pressure fuel pump 86 can be driven using the driving shaft 63, which can achieve a reduction in the number of parts and a reduction in size.

As shown in FIG. 2 and FIG. 3, the valve train 89 includes the first timing sprocket 76 and the second timing sprocket 77 as drive sprockets provided to the driving shaft 63 and a pair of cam sprockets 82 as driven sprockets driven by the first timing sprocket 76 and the second timing sprocket 77 through the first timing chain 83 and the second timing chain 84 as timing chains. The driving shaft 63 is driven by the crankshaft 16 through the speed-reduction mechanism 87. The first timing sprocket 76 and the second timing sprocket 77 have the same outer diameters as that of the cam sprocket 82.

This construction allows the cam sprocket 82 to have a smaller diameter by reducing the rotational frequency of the crankshaft 16 and by having the rotational frequency shared between the first timing sprocket 76 and the cam sprocket 82 and between the second timing sprocket 77 and the cam sprocket 82. This construction therefore exerts advantageous effects in reducing the size of the valve gear 100 and accordingly reducing the size of the internal combustion engine 10.

Figure 6:
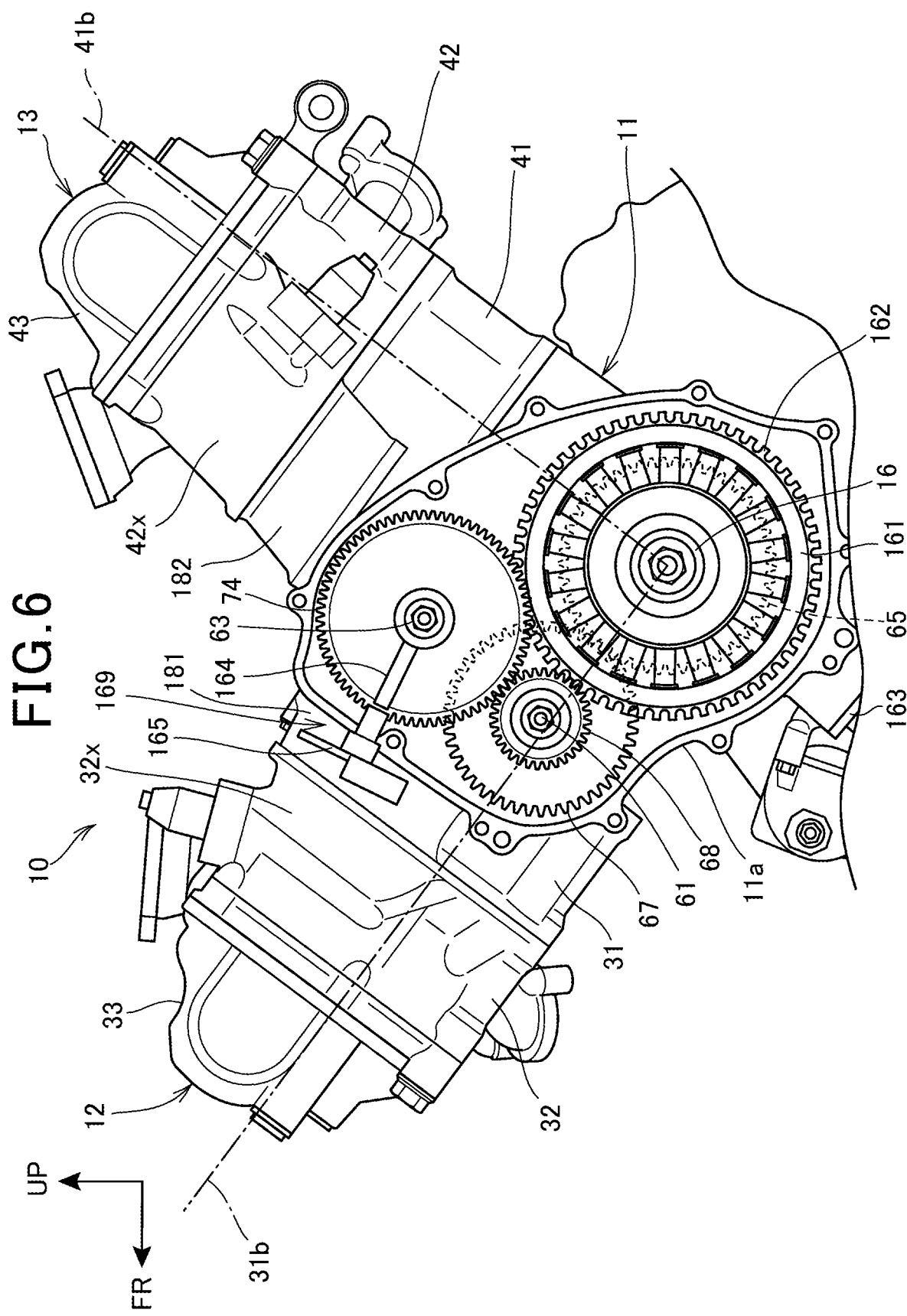
FIG. 6 is a left side view with an ACG cover detached from a crankcase.

FIG. 6 is a left side view with the ACG cover 20 detached from the crankcase 11.

An AC generator 161 and a rotary circular plate 162 disposed on an inner side in the vehicle width direction with respect to the AC generator 161 are mounted on an end portion of the crankshaft 16. The rotary circular plate 162 has a plurality of protrusions formed on an outer peripheral edge at certain intervals. A crankshaft rotation detecting sensor 163 that detects the rotational frequency (which is, the rotational frequency of the crankshaft 16) of the rotary circular plate 162 is disposed in proximity to the protrusions of the rotary circular plate 162. The crankshaft rotation detecting sensor 163 is attached to an annular peripheral wall 11a, which is provided to the crankcase 11 in order to have the ACG cover 20 mounted (see FIG. 5), in a manner penetrating through the peripheral wall 11a.

In side view, a rotation detected body 164 is attached to the driving shaft 63 disposed above the crankshaft 16. Furthermore, a driving shaft rotation detecting sensor 165 that detects rotation of the rotation detected body 164 (in other words, detects the rotational frequency of the driving shaft 63) is attached to a peripheral wall (not shown) of the ACG cover 20, which is mounted on the peripheral wall 11a, in a manner penetrating through the peripheral wall. The rotation detected body 164 and the driving shaft rotation detecting sensor 165 constitute a sensor device 169.

The driving shaft 63 rotates at the same rotational frequency as that of the camshaft 102 (see FIG. 2), and the driving shaft rotation detecting sensor 165 therefore detects the rotational frequency of the camshaft 102.

In side view, the driving shaft rotation detecting sensor 165 is disposed between the cylinder axis 31b of the front cylinder section 12 and the cylinder axis 41b of the rear cylinder section 13. Furthermore, in side view, the driving shaft rotation detecting sensor 165 is overlapped with the front cylinder section 12, more specifically, overlapped with the front cylinder block 31. In this manner, the driving shaft rotation detecting sensor 165 is arranged inward with respect to the contours of the front cylinder section 12 and the rear cylinder section 13 in side view. This arrangement can reduce the size of the internal combustion engine 10 and achieve a more compact construction of the internal combustion engine 10.

Figure 7:
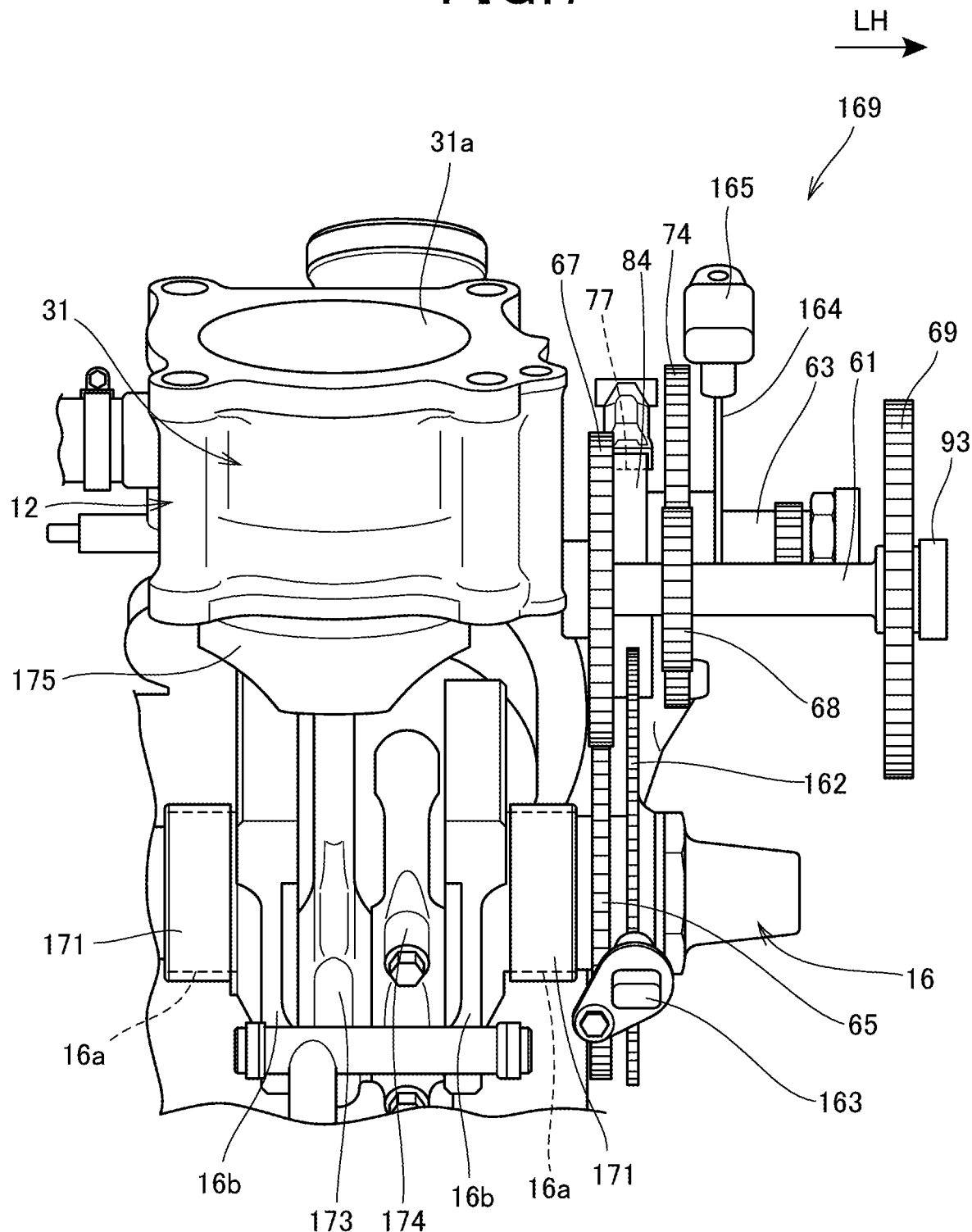
FIG. 7 is a view of the internal combustion engine with some components detached as viewed in the front view of the vehicle.

FIG. 7 is a view of the internal combustion engine 10 with some components detached as viewed in the front view of the vehicle.

The crankshaft 16 includes a pair of crank journals 16a supported by the crankcase 11 (see FIG. 5) through a pair of bearings 171, a pair of weights 16b adjacent to the crank journals 16a, and a crank pin (not shown) connecting the pair of weights 16b with each other. Also, an end portion of a connecting rod 173 on a side of the front cylinder section 12 and an end portion of a connecting rod 174 on a side of the rear cylinder section 13 (see FIG. 6) are swingably connected to the crank pin. The respective other end portions of the connecting rods 173 and 174 are connected with pistons 175 through piston pins (not shown). Each of the pistons 175 is arranged in the cylinder 31a (see FIG. 2) of the front cylinder section 12 and the cylinder 41a (see FIG. 2) of the rear cylinder section 13 (see FIG. 2) in a movable manner.

On the crankshaft 16, the main driving gear 65 is disposed between the rotary circular plate 162 and one of the bearings 171.

The intermediate shaft 61 protrudes outward of the crankshaft 16 in the vehicle width direction. The distal end portion of the intermediate shaft 61 is supported by the side cover 21 (see FIG. 4) through the bearing 93.

The first intermediate gear 67 of the intermediate shaft 61 is disposed at the same position as that of the main driving gear 65 of the crankshaft 16 in the vehicle width direction so as to mesh with the main driving gear 65. The distal end portion of the intermediate shaft 61 is provided with the third intermediate gear 69 positioned on an outer side in the vehicle width direction with respect to the crankshaft 16. On the intermediate shaft 61, the second intermediate gear 68 is disposed closer to the first intermediate gear 67 between the first intermediate gear 67 and the third intermediate gear 69.

Of the first intermediate gear 67, the second intermediate gear 68, and the third intermediate gear 69, the second intermediate gear 68 has a smallest outer diameter, and the third intermediate gear 69 has a largest outer diameter.

Furthermore, on the driving shaft 63, the first timing sprocket 76 (see FIG. 2) and the second timing sprocket 77 are disposed on the inner side in the vehicle width direction with respect to the sub-driving gear 74. More specifically, the second timing sprocket 77 is disposed on the outer side in the vehicle width direction with respect to the first timing sprocket 76.

The rotation detected body 164 is disposed closer to the sub-driving gear 74 between the sub-driving gear 74 and the third intermediate gear 69 in the vehicle width direction.

As described above, on the intermediate shaft 61, the third intermediate gear 69 is disposed at an outermost position in the vehicle width direction, and the second intermediate gear 68 is disposed closer to the first intermediate gear 67. This construction allows the camshaft driving mechanism 80 (see FIG. 2) and the valve train 89 (see FIG. 2) to be disposed on the inner side with respect to the supercharger driving mechanism 90 (see FIG. 2) in the vehicle width direction of the internal combustion engine 10 (see FIG. 2). Each of the camshaft driving mechanism 80 and the valve train 89 includes a larger number of parts than that of the supercharger driving mechanism 90, and a reduction in the size of the internal combustion engine 10 can be effectively achieved by disposing the camshaft driving mechanism 80 and the valve train 89 on the inner side in the vehicle width direction of the internal combustion engine 10. Furthermore, because the supercharger driving mechanism 90 includes a small number of parts, disposing the supercharger driving mechanism 90 on the outer side in the vehicle width direction of the internal combustion engine 10 does not cause an increase in the size of the internal combustion engine 10.

As described above, the intermediate shaft 61 has the third intermediate gear 69 disposed at an outer end portion in the vehicle width direction, has the first intermediate gear 67 as a driven gear, which meshes with the main driving gear 65 as a crankshaft-side driving gear provided to the crankshaft 16, disposed on the inner side in the vehicle width direction with respect to the third intermediate gear 69, and has the second intermediate gear 68 disposed between the third intermediate gear 69 and the first intermediate gear 67. Among the first intermediate gear 67, the second intermediate gear 68, and the third intermediate gear 69, the second intermediate gear 68 has a smallest outer diameter.

This construction allows a compact layout with the second intermediate gear 68 disposed on the intermediate shaft 61 in a manner avoiding interference between the first intermediate gear 67, the second intermediate gear 68, and the third intermediate gear 69 in the axial direction.

Figure 8:
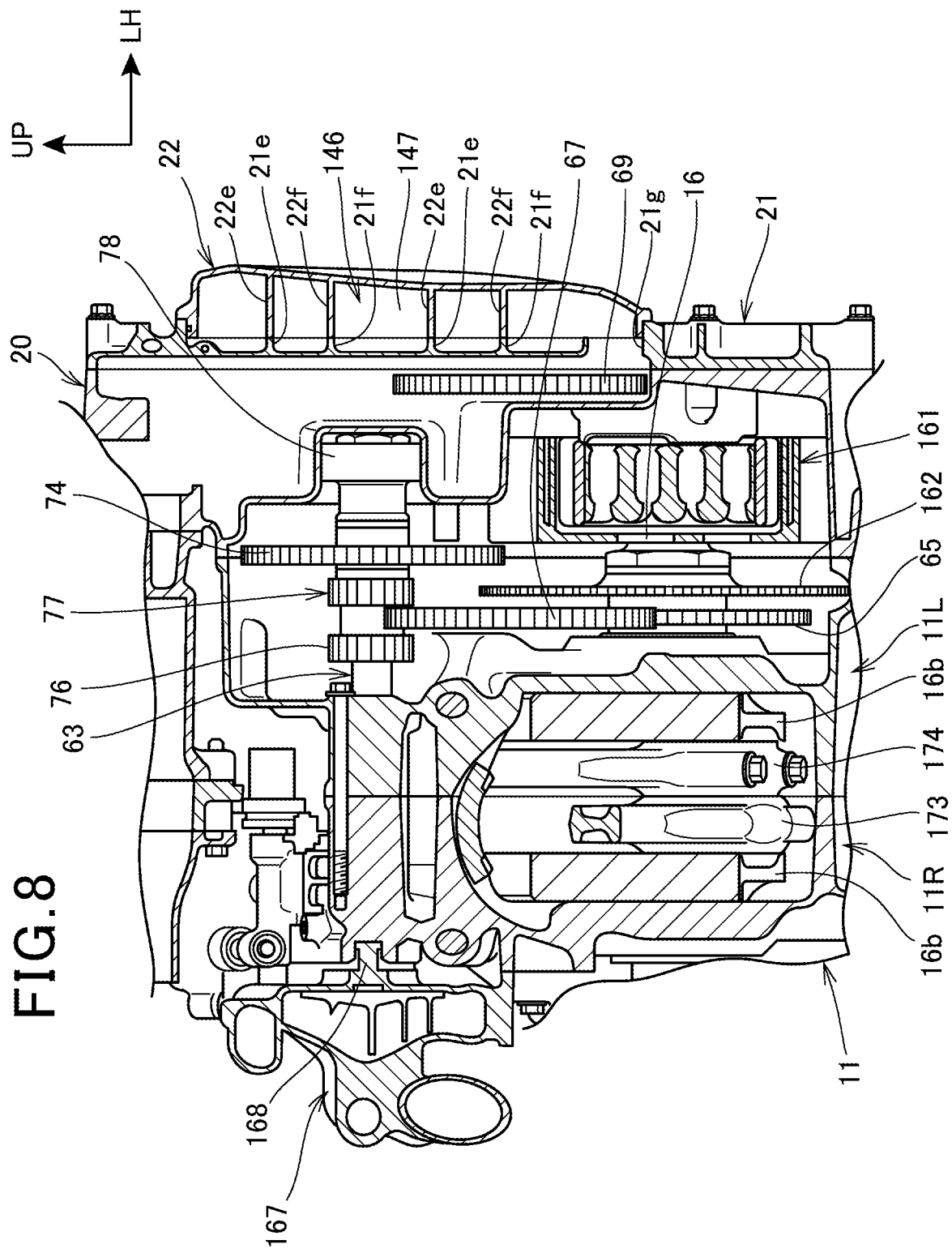
FIG. 8 is a sectional view taken along line VIII-VIII of FIG. 3.

FIG. 8 is a sectional view taken along line VIII-VIII of FIG. 3.

The crankcase 11 is constituted of a left crankcase 11L and a right crankcase 11R as a pair at the right and left. The ACG cover 20 is mounted on the left crankcase 11L.

The driving shaft 63 has the cam 78 disposed on the outer side in the vehicle width direction with respect to the sub-driving gear 74 and has the second timing sprocket 77 and the first timing sprocket 76 disposed on the inner side in the vehicle width direction with respect to the sub-driving gear 74. More specifically, the first timing sprocket 76 is disposed on the inner side in the vehicle width direction with respect to the second timing sprocket 77.

The first timing sprocket 76 and the second timing sprocket 77 are disposed in a manner having the main driving gear 65 of the crankshaft 16 and the first intermediate gear 67 meshing with the main driving gear 65 interposed between the first timing sprocket 76 and the second timing sprocket 77 in the vehicle width direction.

A water pump 167 is coaxially disposed with the driving shaft 63. The water pump 167 is mounted on the right crankcase 11R, and a water pump shaft 168 constituting the water pump 167 is disposed on an extension of the driving shaft 63.

The breather cover 22 has front-side ribs 22e and rear-side ribs 22f formed in a manner extending the front-side ribs 21e and the rear-side ribs 21f provided to the side cover 21 in the vehicle width direction.

In side view, the front-side rib 22e of the breather cover 22 is in an identical shape to that of the front-side rib 21e of the side cover 21 and is overlapped with the front-side rib 21e. Likewise, the rear-side rib 22f of the breather cover 22 is in an identical shape to that of the rear-side rib 21f of the side cover 21 and is overlapped with the rear-side rib 21f.

The breather device 146 configured with the side cover 21 and the breather cover 22 has a breather chamber 147 having a labyrinthine structure configured with the above-described front-side ribs 22e, rear-side ribs 22f, front-side ribs 21e, and rear-side ribs 21f.

In this manner, a capacity of the breather chamber 147 is easily secured by having the breather device 146 provided separately from a body side (the crankcase 11, the front cylinder section 12, and the rear cylinder section 13) of the internal combustion engine 10. Additionally, a difference in level between the suction opening 21g and the discharge port 97 (see FIG. 3) of the breather chamber 147 can be easily secured. Consequently, this construction increases droplets of the liquid oil resulting from the own weight and enhances separation of vapor and liquid.

Furthermore, formation of the front-side rib 22e and the rear-side rib 22f on the breather cover 22 can increase stiffness of the breather cover 22. This construction can prevent a reduction in weight and resonance caused by a thin-walled breather cover 22.

Also, as described above, the ACG cover 20, the side cover 21, and the breather cover 22 are mounted on the left crankcase 11L in a manner overlapping with one another. This construction can enhance an effect of blocking mechanical sounds (such as a sound of meshing gears and drive sounds of the driving first timing chain 83 and the second timing chain 84 of FIG. 2) generated inside the internal combustion engine 10.

As shown in FIG. 3 and FIG. 8, the side cover 21 covering the outside of the supercharger driving mechanism 90 has its outer surface covered by the breather cover 22 formed as a separate cover. The side cover 21 and the breather cover 22 constitute the breather device 146 that separates vapor and liquid from the blow-by gas.

With this construction, formation of the breather device 146 in a lateral side using the side cover 21 and the breather cover 22 allows a layout that ensures the degree of freedom in arrangement of the breather device 146 even when the breather device 146 is unable to be arranged on the body side of the internal combustion engine 10 including the crankcase 11 and others.

As shown in FIG. 4, FIG. 6, and FIG. 8, the side cover 21 is fixed to the ACG cover 20 serving as an auxiliary machine cover for covering the AC generator 161 serving as an auxiliary machine equipped to the internal combustion engine 10. The oil passage 150 on which the oil travels is formed on a faying surface between the ACG cover 20 and the side cover 21, and the oil passage 150 communicates with the inside of the supercharger 18 on a downstream side of the oil passage 150.

This construction allows formation of the oil passage 150 leading to the supercharger 18 using the ACG cover 20 and the side cover 21, which renders formation of the oil passage 150 easier, compared to a construction in which the oil passage 150 is formed inside the internal combustion engine 10.

Figure 9:
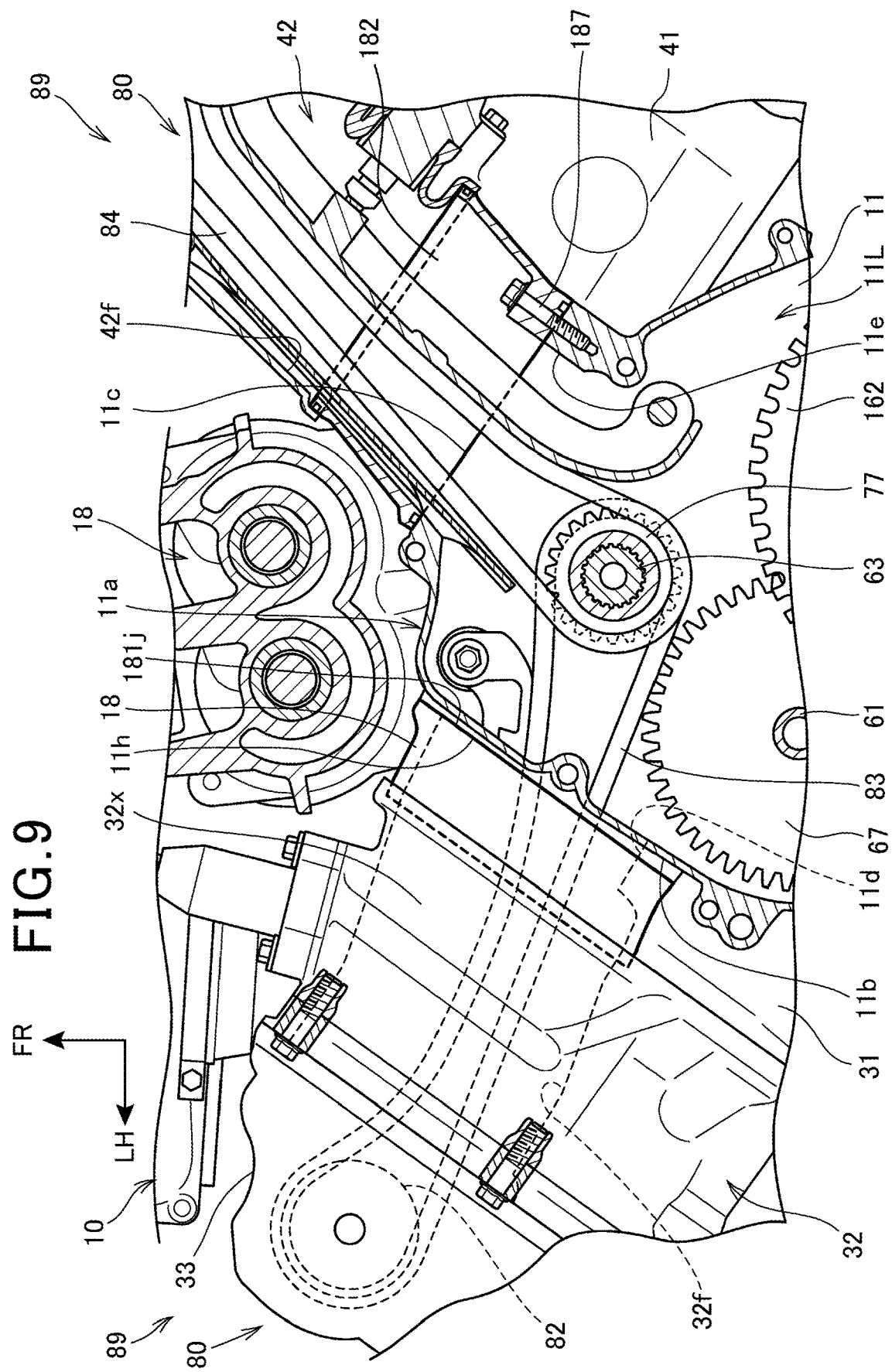
FIG. 9 is a sectional view of a front chain chamber and a rear chain chamber of the internal combustion engine.

FIG. 9 is a sectional view of a front chain chamber 181 and a rear chain chamber 182 of the internal combustion engine 10. FIG. 9 is a view of the internal combustion engine 10 cut in a direction perpendicularly intersecting with the crankshaft 16 (see FIG. 6) when viewed from a left lateral side of the internal combustion engine 10.

The peripheral wall 11a of the crankcase 11 (more specifically, the left crankcase 11L (see FIG. 8)) has a front inclined portion 11b positioned in front of the driving shaft 63 and inclined downwardly toward the front and has a rear inclined portion 11c positioned in a rearward and obliquely upward direction of the driving shaft 63 and inclined downwardly toward the rear.

The front inclined portion 11b has an opening 11d having the first timing chain 83 pass through, and the rear inclined portion 11c has an opening 11e having the second timing chain 84 pass through.

Also, the front cylinder head 32 has an opening 32f having the first timing chain 83 pass through, and the rear cylinder head 42 has an opening 42f having the second timing chain 84 pass through.

A side wall 32x corresponding to a portion with the opening 32f of the front cylinder head 32 protrudes outward in the vehicle width direction with respect to another portion of the side wall without the opening 32f, and a side wall 42x (see FIG. 6) corresponding to a portion with the opening 42f of the rear cylinder head 42 protrudes outward in the vehicle width direction with respect to another portion of the side wall without the opening 42f. Also, the front inclined portion 11b and the rear inclined portion 11c of the peripheral wall 11a protrude outward in the vehicle width direction with respect to other portions of the crankcase 11.

The hollow front chain chamber 181 having the first timing chain 83 pass through is fittedly mounted between a lower end of the side wall 32x of the front cylinder head 32 and the front inclined portion 11b of the left crankcase 11L.

Likewise, the hollow rear chain chamber 182 having the second timing chain 84 pass through is fittedly mounted between a lower end of the side wall 42x of the rear cylinder head 42 and the rear inclined portion 11c of the left crankcase 11L.

A structure and an assembly state of the front chain chamber 181 of the front cylinder section 12 will now be described. Because the rear chain chamber 182 has the same basic structure and the same assembly state as those of the front chain chamber 181, description of the rear chain chamber 182 will be omitted.

Figure 10:
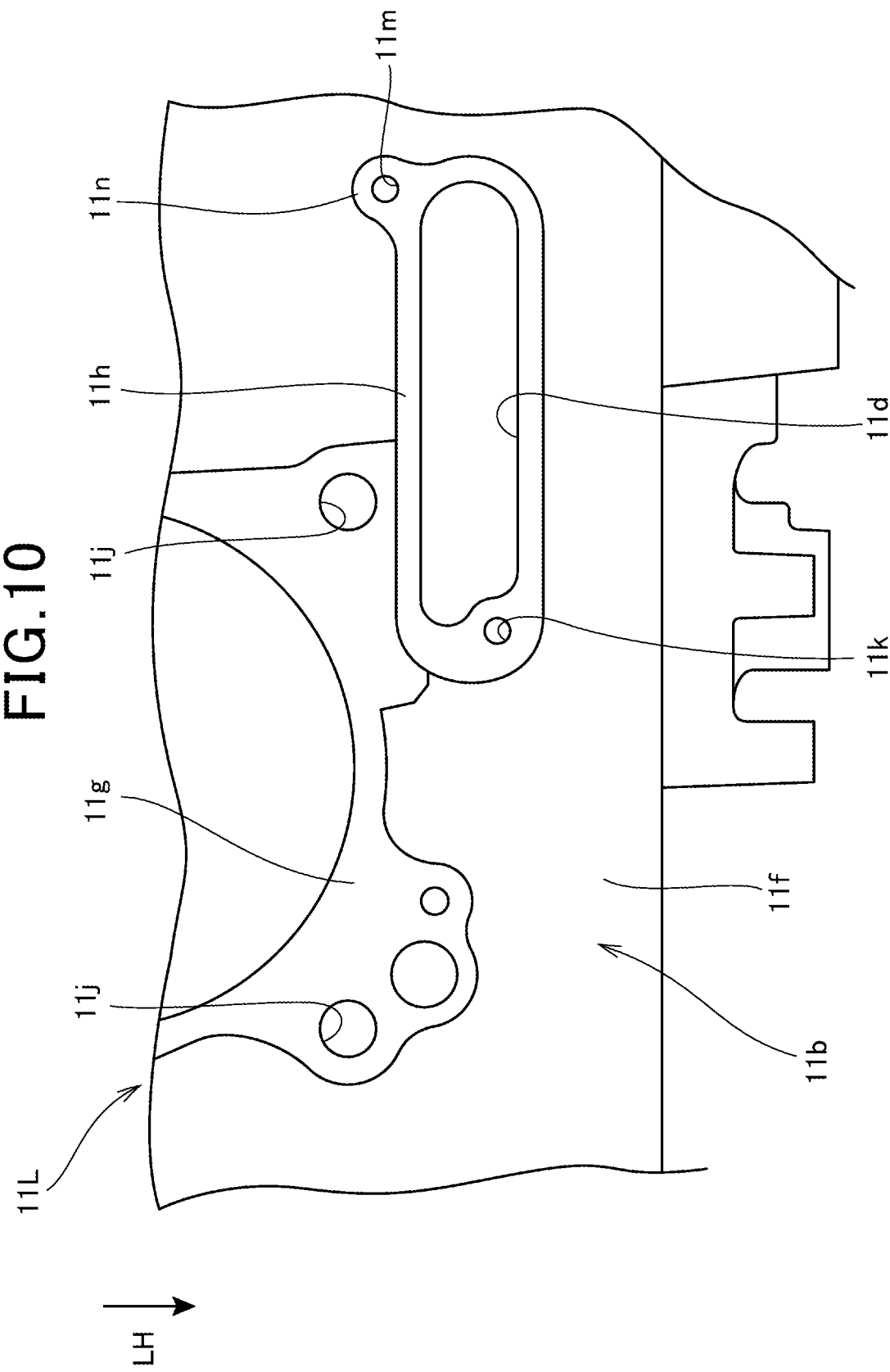
FIG. 10 is a view of a front inclined portion of a left crankcase.

FIG. 10 is a view of the front inclined portion 11b of the left crankcase 11L.

The front inclined portion 11b of the left crankcase 11L includes a base surface 11f formed of a casting surface and includes a block mounting surface 11g and a chamber mounting surface 11h each formed in a manner protruding from the base surface 11f.

The block mounting surface 11g is a surface on which the front cylinder block 31 (see FIG. 9) is mounted, and a plurality of bolt holes 11j into each of which the stud bolt 36 (see FIG. 2) is threadedly inserted are bored on the block mounting surface 11g.

The chamber mounting surface 11h is a portion on which an end face of an end portion of the front chain chamber 181 (see FIG. 9) abuts. The opening 11d in a substantially oval shape and a pair of screw holes 11k and 11m into which bolts for fixing the front chain chamber 181 are threadedly inserted are formed on the chamber mounting surface 11h. Furthermore, an inward protruding surface 11n protruding inward in the vehicle width direction is formed at a rear portion of the chamber mounting surface 11h, and the screw hole 11m is bored on the inward protruding surface 11n.

Figure 11:
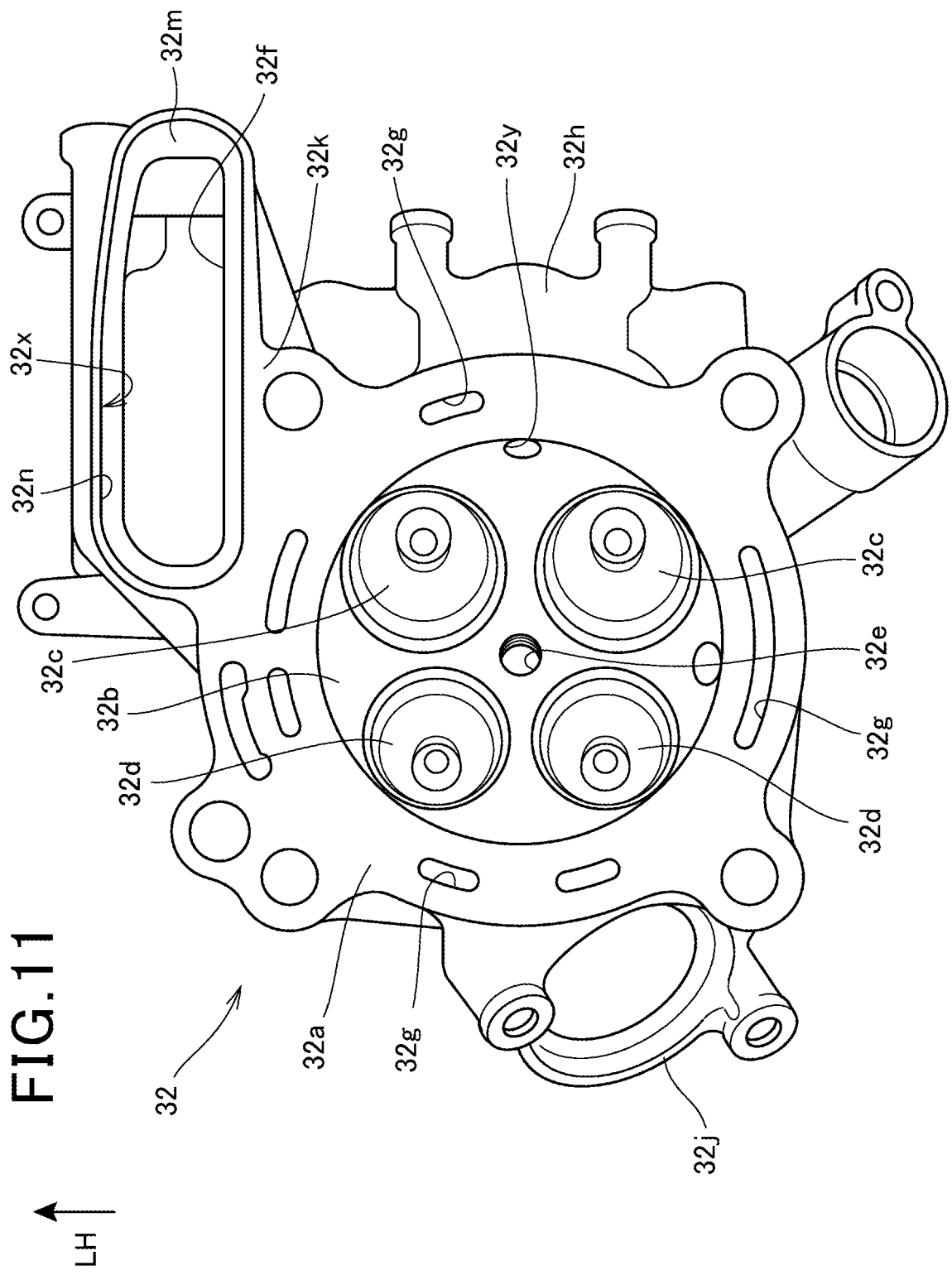
FIG. 11 is a bottom view of a front cylinder head.

FIG. 11 is a bottom view of the front cylinder head 32. The front cylinder head 32 has a block mating face 32a mounted in a manner mating with the front cylinder block 31 (see FIG. 9).

The block mating face 32a has a combustion chamber concave portion 32b forming a ceiling portion of the combustion chamber. A pair of intake ports 32c and a pair of exhaust ports 32d are open on the combustion chamber concave portion 32b, and additionally, a screw hole 32e for an ignition plug and an opening 32y for a fuel injection valve are bored on the combustion chamber concave portion 32b. Furthermore, a plurality of water holes 32g leading to a water jacket (not shown) filled with coolant are bored on the block mating face 32a.

An intake connecting pipe portion 32h connected with the intake device 14 (see FIG. 1) is formed at a rear portion of the front cylinder head 32, and an exhaust connecting pipe portion 32j connected with an exhaust device (not shown) is formed at a front portion of the front cylinder head 32.

The front cylinder head 32 further includes an extending face 32k made flush with the block mating face 32a and extending rearward and outward in the vehicle width direction from the block mating face 32a, an annular step portion 32m formed in a manner recessed from the extending face 32k, the opening 32f formed inside the annular step portion 32m, and an annular side wall 32z formed around the annular step portion 32m.

The other end portion of the front chain chamber 181 (see FIG. 9) is inserted in the annular side wall 32z, and an end face of the other end portion of the front chain chamber 181 abuts on the annular step portion 32m.

Figure 12A:
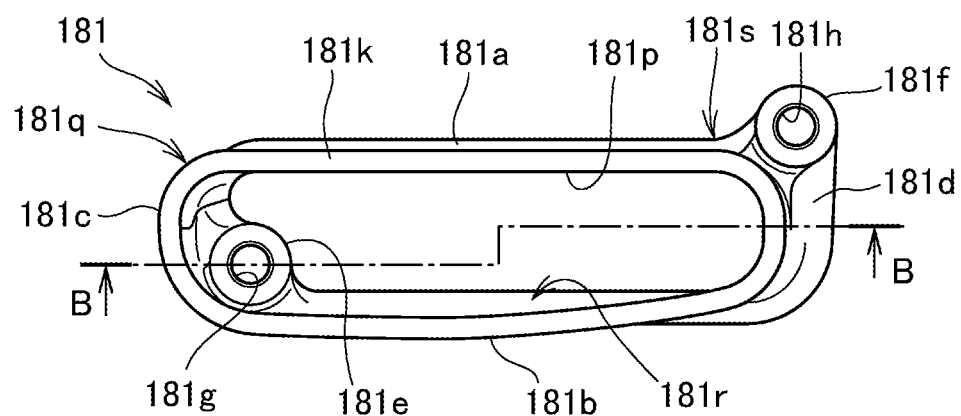
Figure 12B:
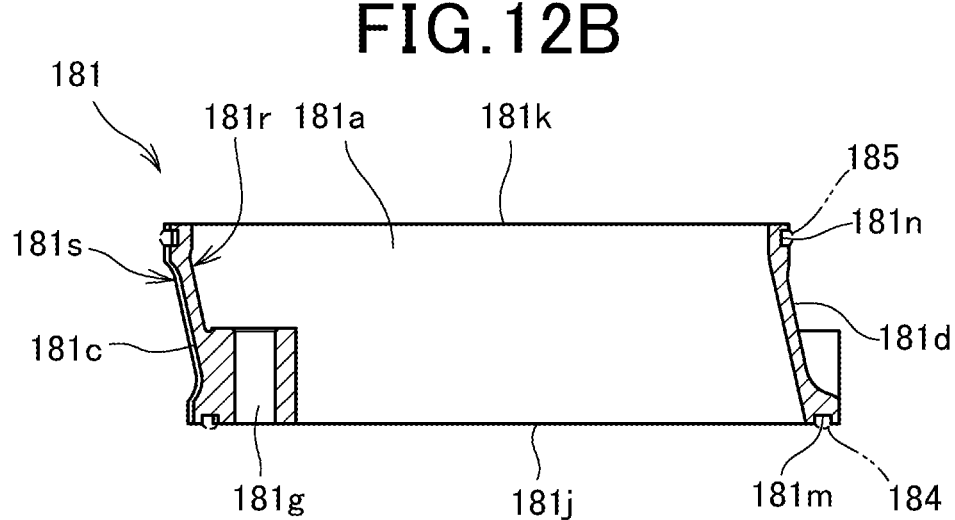
Figure 12C:
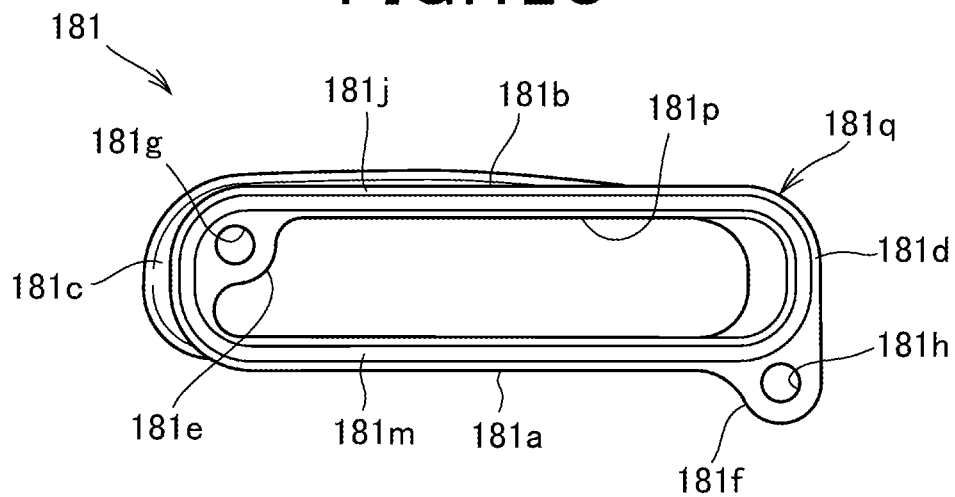

FIG. 12A to FIG. 12C are illustrative views of the front chain chamber 181, in which FIG. 12A is a plan view of the front chain chamber 181, FIG. 12B is a sectional view of FIG. 12A taken along line B-B, and FIG. 12C is a bottom view of the front chain chamber 181.

As shown in FIG. 12A, the front chain chamber 181 is formed in a box shape with two faces facing each other open. The front chain chamber 181 is integrally provided with an interior wall 181a, an exterior wall 181b, a front wall 181c, a rear wall 181d, and a pair of boss portions 181e and 181f. The interior wall 181a, the exterior wall 181b, the front wall 181c, and the rear wall 181d constitute a peripheral wall 181q, and the peripheral wall 181q forms an opening 181p.

The front-side boss portion 181e is formed on an inner peripheral surface 181r (more specifically, on an edge portion between the exterior wall 181b and the front wall 181c) of the peripheral wall 181q, and a bolt insertion hole 181g is bored on the boss portion 181e. The rear-side boss portion 181*f* is formed on an outer peripheral surface 181*s* (more specifically, on a corner portion between the interior wall 181*a* and the rear wall 181*d*) of the peripheral wall 181*q*, and a bolt insertion hole 181*h* is bored on the boss portion 181*f*.

As shown in FIGS. 12B and 12C, a bottom surface 181*j* and an upper surface 181*k* of the front chain chamber 181 are formed parallel with each other. The front wall 181*c* and the rear wall 181*d* are both inclined upwardly toward the front with respect to the bottom surface 181*j* and the upper surface 181*k*.

The bottom surface 181*j* has a bottom surface annular groove 181*m* to which an O-ring 184 is fitted.

Additionally, a peripheral wall annular groove 181*n* to which an O-ring 185 is fitted is formed on the outer peripheral surface 181*s*, specifically, on a portion closer to the upper surface 181*k* of the outer peripheral surface 181*s*, of the peripheral wall 181*q*.

An assembly procedure of the above-described front chain chamber 181 will now be described.

Firstly, in FIGS. 12B and 12C, the O-rings 184 and 185 are fitted to the bottom surface annular groove 181*m* and the peripheral wall annular groove 181*n*, respectively, of the front chain chamber 181.

Then, in FIG. 11 and FIG. 12A, an end portion on the side of the upper surface 181*k* of the front chain chamber 181 is inserted into the annular side wall 32*z* of the front cylinder head 32, and the upper surface 181*k* is arranged to abut on the annular step portion 32*m*. In this process, in FIG. 9 and FIG. 10, a gap is formed between the bottom surface 181*j* of the front chain chamber 181 and the chamber mounting surface 11*h* of the left crankcase 11L, and the bottom surface 181*j* of the front chain chamber 181 is aligned to the chamber mounting surface 11*h*.

In FIG. 10, FIG. 11, and FIG. 12A, a bolt 187 (see FIG. 13) is arranged to pass through the opening 32*f* of the front cylinder head 32 and the bolt insertion hole 181*g* of the front chain chamber 181 from above of the opening 32*f*, and a distal end portion of the bolt 187 is threadedly inserted into the screw hole 11*k* of the left crankcase 11L. Also, another bolt 187 is arranged to pass through the bolt insertion hole 181*h* of the front chain chamber 181, and a distal end portion of the bolt 187 is threadedly inserted into the screw hole 11*m* of the left crankcase 11L.

In this manner, assembly of the front chain chamber 181 is completed by fixing the front chain chamber 181 to the left crankcase 11L with a pair of bolts 187.

The outer peripheral surface 181*s* on the side of the upper surface 181*k* of the front chain chamber 181 and an inner peripheral surface 32*n* of the annular side wall 32*z* of the front cylinder head 32 are sealed with an inner and outer diameter sealing structure having the O-ring 185 interposed between the inner peripheral surface and the outer peripheral surface. The bottom surface 181*j* of the front chain chamber 181 and the chamber mounting surface 11*h* of the left crankcase 11L are sealed with a planar surface sealing structure having the O-ring 184 interposed between the two planar surfaces.

For example, such a construction may be employed that forms a planar surface on the front cylinder head 32 and seals the upper surface 181*k* of the front chain chamber 181 and the planar surface of the front cylinder head 32 with an O-ring interposed therebetween. In this construction, a distance between the chamber mounting surface 11*h* of the left crankcase 11L and a mounting surface (for example, the annular step portion 32*m*) of the front cylinder head 32 may vary depending on a difference in machining and assembly accuracy between the left crankcase 11L, the front cylinder block 31, and the front cylinder head 32. Strained force of the O-ring when the front chain chamber 181 is assembled between the chamber mounting surface 11*h* and the mounting surface of the front cylinder head 32 thus may be considerably changed, which accordingly changes the sealing properties.

From this point of view, in this embodiment, one of both end portions of the front chain chamber 181 is sealed by fitting the outer peripheral surface 181*s* of the front chain chamber 181 to the inner peripheral surface 32*n* of the front cylinder head 32. This construction can eliminate disadvantageous effects caused by the above-described difference in assembly accuracy and can prevent a change in the strained force of the O-ring. The sealing properties are therefore ensured.

Figure 13:
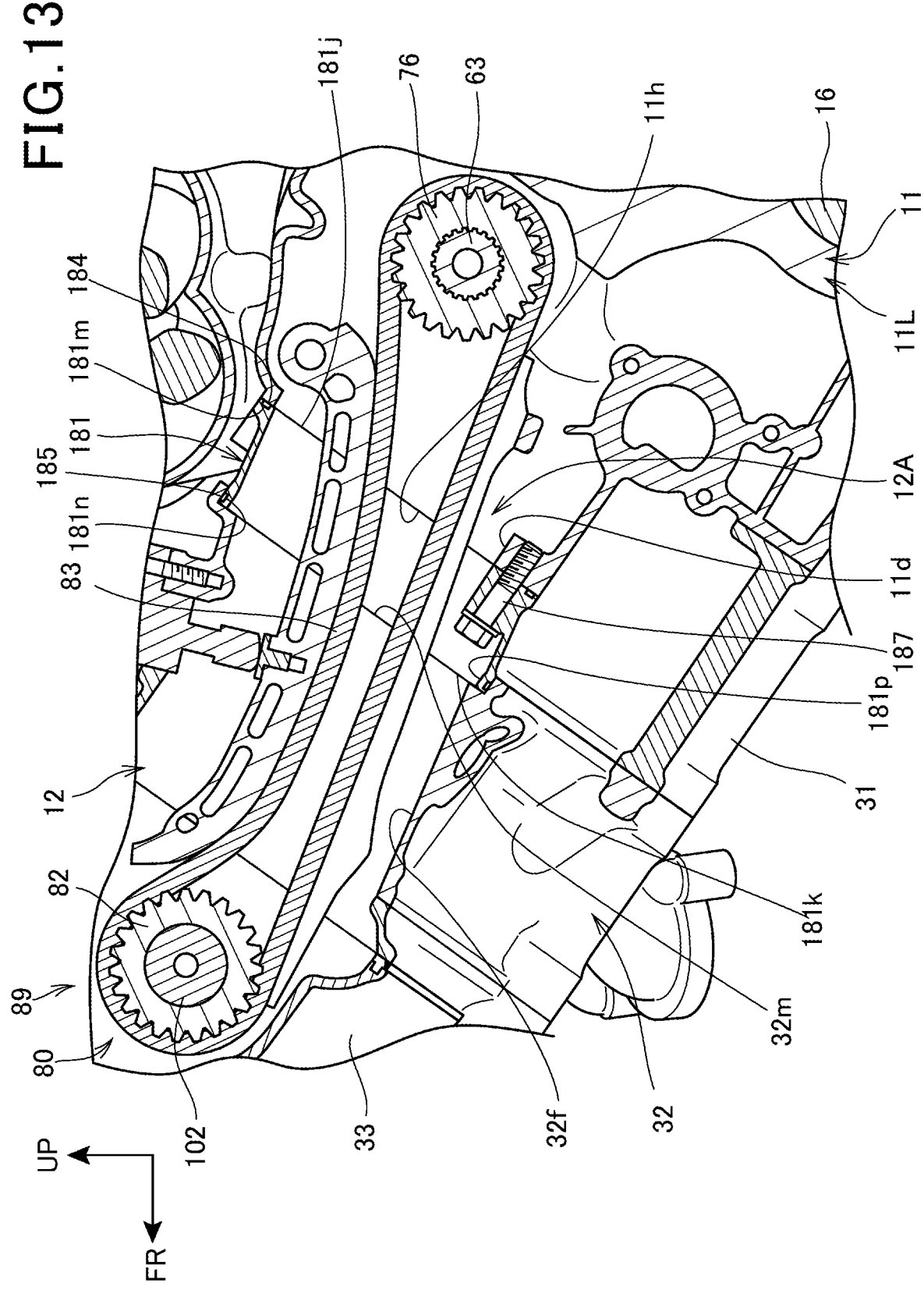
FIG. 13 is a sectional view of a chain passage of a front cylinder section.

FIG. 13 is a sectional view of a chain passage 12A of the front cylinder section 12.

The front chain chamber 181 is mounted on the chamber mounting surface 11*h* of the left crankcase 11L with the pair of bolts 187 (only one of the bolts 187 is shown).

The opening 11*d* of the left crankcase 11L, the opening 181*p* of the front chain chamber 181, and the opening 32*f* of the front cylinder head 32 form the chain passage 12A of the front cylinder section 12.

In this manner, no openings for passing the first timing chain 83 therethrough is necessarily provided to the front cylinder block 31 by connecting the left crankcase 11L and the front cylinder head 32 with each other through the front chain chamber 181. This construction can increase the degree of freedom in design of the front cylinder block 31. Furthermore, the front chain chamber 181 has a simple construction and the sealing construction is also simple, which facilitates the assembly process and ensures the sealing. This construction can prevent an increase in the cost.

As shown in FIG. 2, FIG. 9, and FIG. 13, the internal combustion engine 10 includes the crankcase 11 accommodating the crankshaft 16, the front cylinder block 31 and the rear cylinder block 41 mounted on the crankcase 11, and the front cylinder head 32 and the rear cylinder head 42 mounted on the front cylinder block 31 and the rear cylinder block 41. The chain passage 12A as an accommodation chamber accommodating the valve train 89 includes the front chain chamber 181 and the rear chain chamber 182 as accommodation members formed separately from the side cover 21 and the front cylinder block 31 and the rear cylinder block 41. The front chain chamber 181 has an end portion sealed together with the front cylinder head 32 with an inner and outer diameter sealing structure using the O-ring 185 as an annular sealing member and has another end portion sealed together with the crankcase 11 with a planar surface sealing structure using the O-ring 184 as an annular sealing member. Likewise, the rear chain chamber 182 has an end portion sealed together with the rear cylinder head 42 with the inner and outer diameter sealing structure using the O-ring 185 as an annular sealing member and has another end portion sealed together with the crankcase 11 with the planar surface sealing structure using the O-ring 184 as an annular sealing member.

This construction renders fastening distortion and heating distortion even by having a part of the chain passage 12A separately formed, thereby controlling oil consumption and the amount of blow-by gas. Furthermore, combination use of the inner and outer diameter sealing structure and the planar surface sealing structure can allow differences in size between the crankcase 11 and the front cylinder head 32 and between the crankcase 11 and the rear cylinder head 42, the differences resulting from machining and assembly accuracy.

This construction further allows the front cylinder block 31 and the rear cylinder block 41 to be shared and also allows the chain passage 12A to be shared between the front cylinder section 12 and the rear cylinder section 13. Additionally, the degree of freedom in design of the crankcase 11 can be increased.

It should be understood that the above-described embodiment is given to illustrate an aspect of the present invention, and various modifications and applications may be arbitrarily made without departing from the spirit of the invention.

The present invention is applicable to an internal combustion engine of a vehicle and to an internal combustion engine of a machine other than vehicles.

REFERENCE SINGS LIST

10 . . . Internal combustion engine
11 . . . Crankcase
12A . . . Chain passage (accommodation chamber of valve train)
16 . . . Crankshaft
18 . . . Supercharger
20 . . . ACG cover (auxiliary machine cover)
21 . . . Side cover
31 . . . Front cylinder block (cylinder block)
32 . . . Front cylinder head (cylinder head)
41 . . . Rear cylinder block (cylinder block)
32 . . . Rear cylinder head (cylinder head)
61 . . . Intermediate shaft
63 . . . Driving shaft
65 . . . Main driving gear (crankshaft-side driving gear)
67 . . . First intermediate gear (driven gear)
68 . . . Second intermediate gear (valve-side driving gear)
69 . . . Third intermediate gear (driving force transmission member, supercharger-side driving gear)
71 . . . Fourth intermediate gear (driving force transmission member)
76 . . . First timing sprocket (drive sprocket)
77 . . . Second timing sprocket (drive sprocket)
78 . . . Cam (driving cam)
82 . . . Cam sprocket (driven sprocket)
83 . . . First timing chain (timing chain)
84 . . . Second timing chain (timing chain)
86 . . . High-pressure fuel pump
87 . . . Speed-reduction mechanism
88 . . . Fuel injection valve (fuel injector)
89 . . . Valve train
90 . . . Supercharger driving mechanism
118 . . . Exhaust valve
122 . . . Intake valve
146 . . . Breather device
161 . . . AC generator (auxiliary machine)
181 . . . Front chain chamber (accommodation member)
182 . . . Rear chain chamber (accommodation member)
184, 185 . . . O-ring (annular sealing member)

The invention claimed is:

1. A running gear structure of an internal combustion engine comprising a supercharger and a supercharger driving mechanism transmitting power to the supercharger and driving the supercharger,
wherein
the supercharger driving mechanism is driven by power of a crankshaft rotated by explosion in a cylinder equipped in a cylinder section of the internal combustion engine accommodated in a crankcase,
the crankshaft is provided with a main driving gear,
the supercharger driving mechanism comprises a first intermediate gear meshing with the main driving gear, an intermediate shaft positioned along a vehicle width direction and provided with and rotated by the first intermediate gear, a third intermediate gear disposed at an outer end portion of the intermediate shaft in the vehicle width direction, and a fourth intermediate gear that meshes with the third intermediate gear and a fifth intermediate gear that meshes with a rotor shaft gear provided on a rotor shaft of a rotor of the supercharger,
the third intermediate gear and the fourth intermediate gear are disposed on an outer side in a vehicle width direction of a camshaft driving mechanism that drives a camshaft of the cylinder section, and
a second intermediate gear that drives the camshaft driving mechanism is provided on the intermediate shaft.

2. The running gear structure of an internal combustion engine according to claim 1, wherein the second intermediate gear is positioned on the intermediate shaft between the third intermediate gear and the first intermediate gear, and among the first intermediate gear, the second intermediate gear, and the third intermediate gear, the second intermediate gear has a smallest outer diameter.

3. The running gear structure of an internal combustion engine according to claim 1, wherein the internal combustion engine includes a fuel injector and a fuel pump, the fuel injector injecting fuel into the cylinder, the fuel pump pumping fuel to the fuel injector, and the camshaft driving mechanism is provided with a driving shaft, wherein the driving shaft is provided with a driving cam that drives the fuel pump.

4. The running gear structure of an internal combustion engine according to claim 3, wherein the camshaft driving mechanism includes a drive sprocket provided on the driving shaft and a driven sprocket driven by the drive sprocket through a timing chain, the driving shaft being driven by the crankshaft through a speed-reduction mechanism, the drive sprocket being configured to have a same outer diameter as a diameter of the driven sprocket.

5. The running gear structure of an internal combustion engine according to claim 1, wherein a side cover that covers an exterior of the supercharger driving mechanism has an outer surface covered by a separate cover, and the side cover and the separate cover form a breather device that separates vapor and liquid from blow-by gas.

6. The running gear structure of an internal combustion engine according to claim 5, wherein the side cover is fixed to an auxiliary machine cover that covers an auxiliary machine provided to the internal combustion engine, and an oil passage on which oil travels is formed on a faying surface between the auxiliary machine cover and the side cover, the oil passage communicating with an inside of the supercharger on a downstream side of the oil passage.

7. The running gear structure of an internal combustion engine according to claim 1, wherein the internal combustion engine includes a cylinder block mounted on a crankcase, and a cylinder head mounted on the cylinder block, and
an accommodation chamber accommodating a valve train includes an accommodation member formed separately from a side cover and the cylinder block, the accommodation member having an end portion sealed together with the cylinder head with an inner and outer diameter sealing structure using an annular sealing member and having another end sealed together with the crankcase with a planar surface sealing structure using another annular sealing member.

* * * * *